United States Patent
Kitano et al.

[11] 3,801,181
[45] Apr. 2, 1974

[54] GRADIENT INDEX LIGHT CONDUCTOR

[75] Inventors: Ichiro Kitano, Kobe; Ken Koizumi, Itami; Hiroyoshi Matsumura, Osaka; Kunihiko Mukai, Tsu; Teiji Uchida, Tokyo, all of Japan

[73] Assignee: Nippon Selfoc Kabushiki Kaisha, Tokyo-to, Japan

[22] Filed: Dec. 7, 1971

[21] Appl. No.: 205,667

Related U.S. Application Data
[63] Continuation of Ser. No. 848,471, Aug. 8, 1969, abandoned.

[30] Foreign Application Priority Data

| Aug. 10, 1968 | Japan | 43-56968 |
| Aug. 21, 1968 | Japan | 43-60097 |
| Aug. 21, 1968 | Japan | 43-60098 |
| Aug. 21, 1968 | Japan | 43-60099 |
| Aug. 21, 1968 | Japan | 43-60100 |
| Sept. 26, 1968 | Japan | 43-70075 |

[52] U.S. Cl. ... 350/96 R, 350/96 WG, 350/175 GN
[51] Int. Cl. ............................................. G02b 5/14
[58] Field of Search .......... 350/96 R, 96 B, 96 WG, 350/175 GN

[56] References Cited
UNITED STATES PATENTS

| 3,614,197 | 10/1971 | Nishizawa et al. | 350/96 WG |
| 3,320,114 | 5/1967 | Schulz | 350/96 R X |
| 3,434,774 | 3/1969 | Miller | 350/96 WG |

OTHER PUBLICATIONS
Miller, Article in Bell System Technical Journal, Vol. 44, No. 9, Nov. 1965, pgs. 2017-2030 cited.
Wood, Physical Optics, 2nd Edition, Published in 1911, pgs. 86-91 cited.
Kawakami et al., Article in Proceedings of the IEEE, pgs. 2148-2149 cited Dec. 1965.

*Primary Examiner*—David H. Rubin
*Attorney, Agent, or Firm*—Robert E. Burns; Emmanuel J. Loboto

[57] ABSTRACT

Novel optical lens elements are disclosed, each of said elements consisting of a transparent body having two end surfaces crossing its center axis and having a refractive index distribution capable of substantially satifying the following relation.

$$n = N (1 \pm a r^2)$$

where $N$ represents its refractive index at a point on the center axis on a sectional area perpendicular to said center axis, $n$ represents its refractive index at a radial point at a distance $r$ from the former point, and $a$ represents a positive constant.

Furthermore, various applications of the above-mentioned optical lens elements are disclosed, said applications corresponding to various optical instruments such as, for example, fiberscopes made of combinations of the optical lens element and an optical fiber bundle, a compound optical lens consisting of a plurality of the optical lens elemnts which are parallelly arranged, a recording element made of a combination of the optical lens element and a photosensitive layer, an image transmission optical device having a high resolution and being very easy in the handling and preservation, a view finder, and various light-beam transmitting conducters and their connection parts.

3 Claims, 62 Drawing Figures

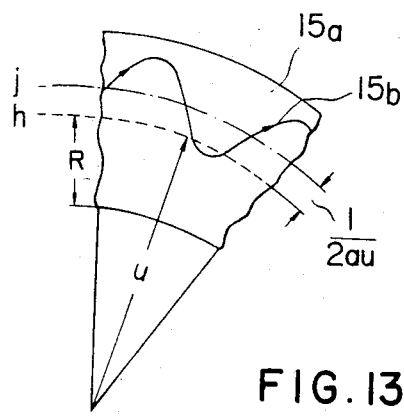
FIG. 11
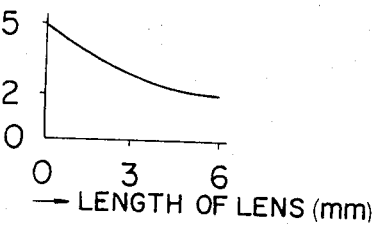
FIG. 12
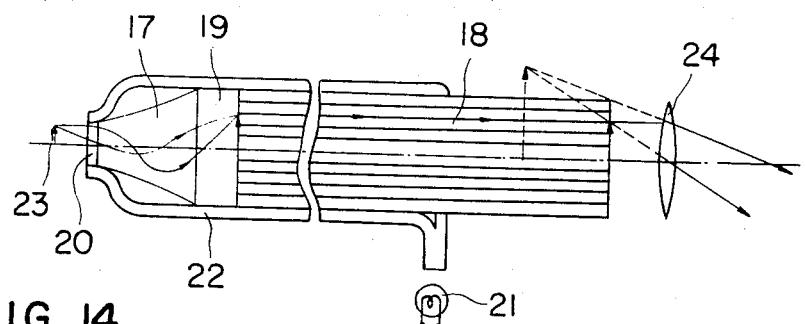
FIG. 13
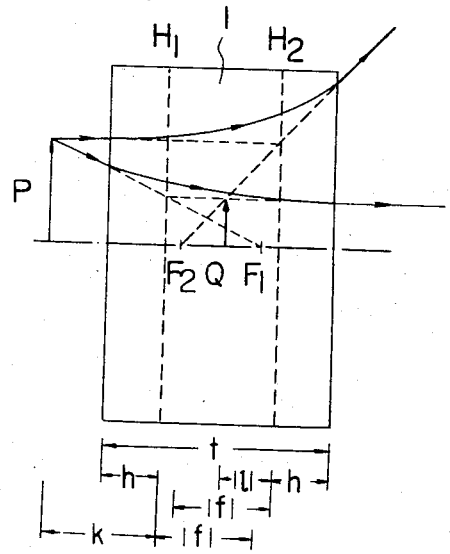
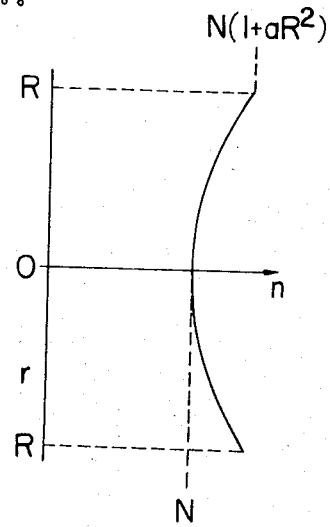
FIG. 14

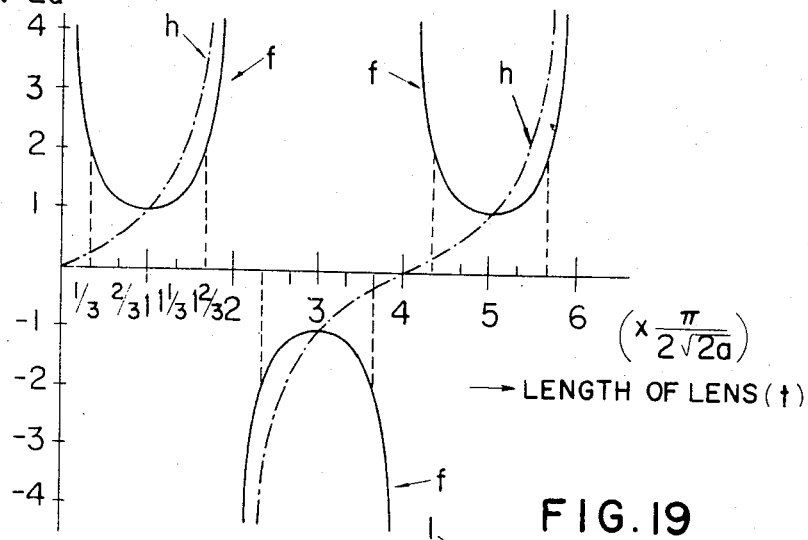
FIG. 18
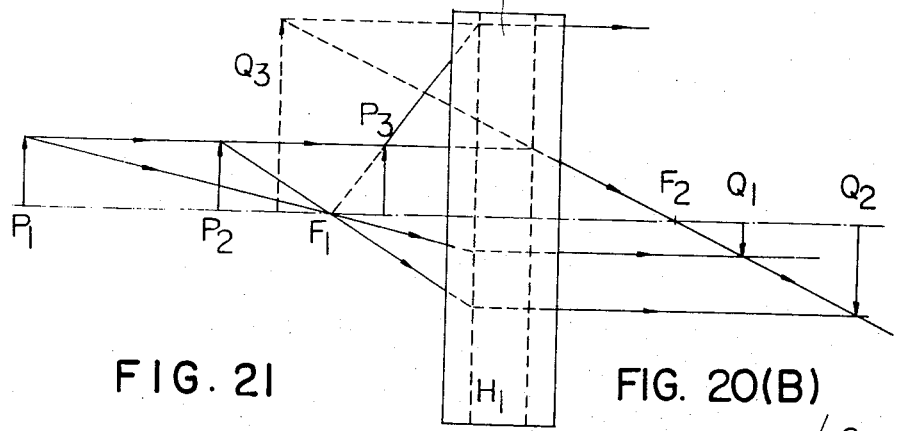
FIG. 19
FIG. 21        FIG. 20(B)
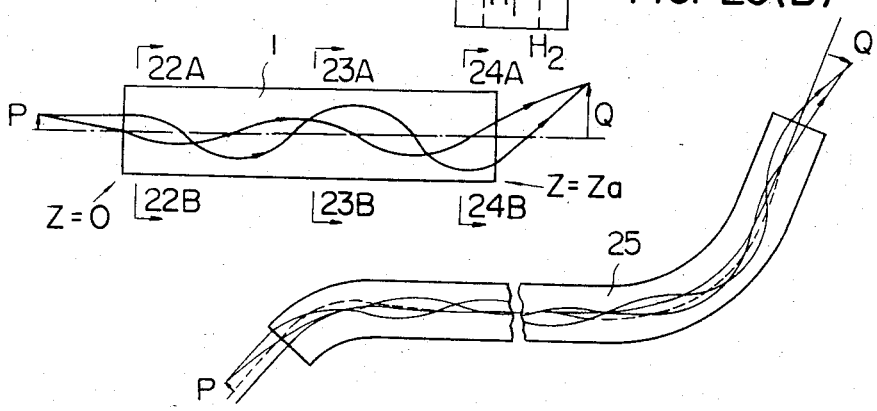

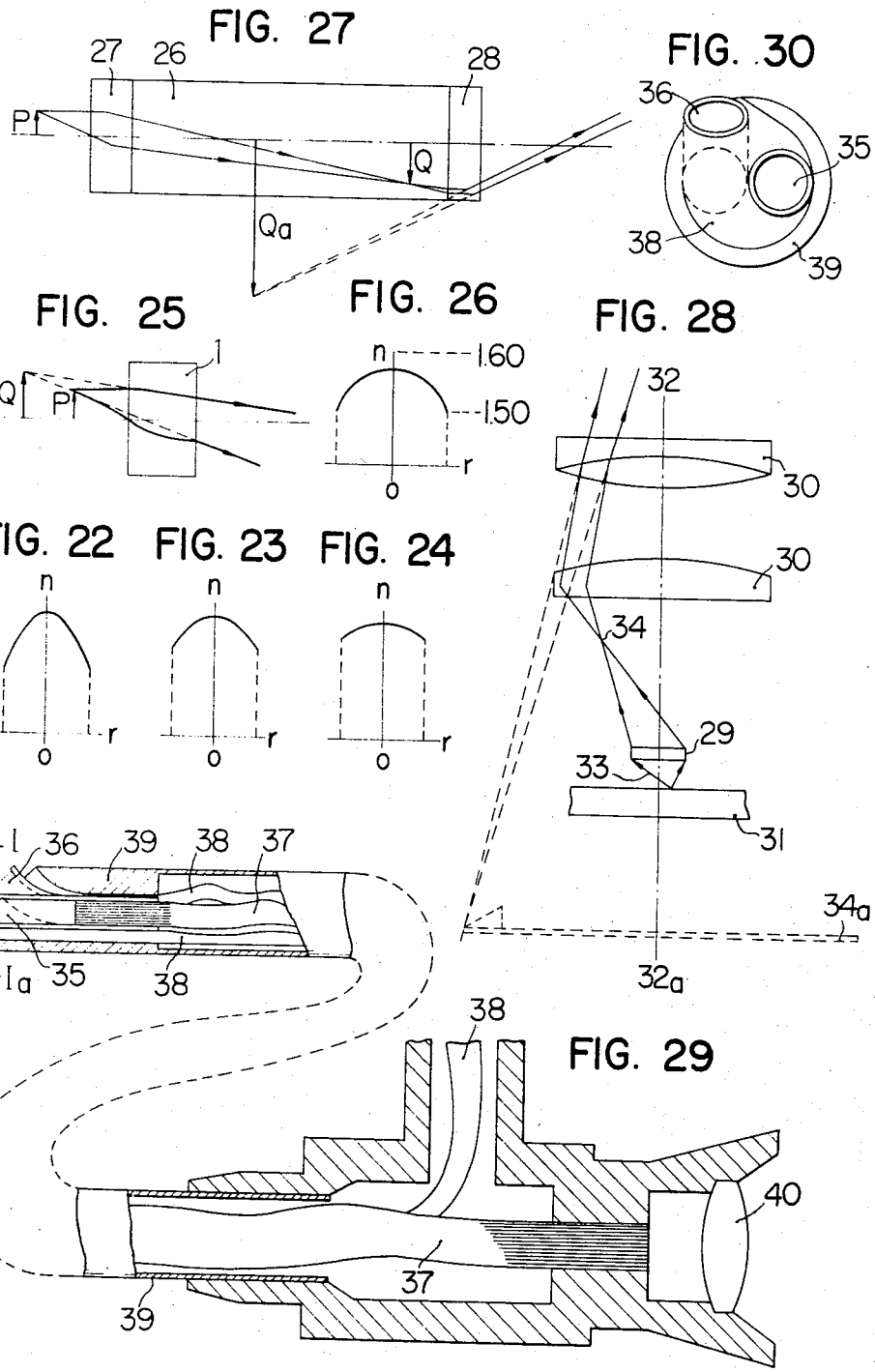

GRADIENT INDEX LIGHT CONDUCTOR

This is a continuation of application Ser. No. 848,471 filed Aug. 8, 1969 and now abandoned.

BACKGROUND OF THE INVENTION

A fiberscope consists fundamentally of a bundle of optical fibers arranged in such a manner that the fibers are disposed in the same order at both ends, and an objective and ocular lens provided respectively at two ends of the bundle. An image of an object to be observed is formed at one end of the bundle of the optical fibers by means of the object and the same image is transmitted to the other end of the bundle of the optical fibers. This image is viewed directly with the naked eye or led to a recording device through an ocular lens. When such a fiberscope is utilized as a borescope to be inserted into somatic cavities for observation, its diameter is often required to be as small as possible. However, primarily because the production of objectives with a small diameter involves much difficulty, fiberscopes having a small diameter, such as those with a diameter of their image transmitting portion or their effective diameter of less than 1 mm., have conventionally been unobtainable. For, in spite of the fact that the objectives of prior fiberscopes must have their surfaces ground into definite curvatures, a high degree of precision in such grinding operation could not be obtained in the case of lenses having a small diameter, so that the production of small-diameter lenses having a practically applicable degree of resolving power, for instance those with a diameter of less than 1 mm., could not be expected. Furthermore, in the conventional fiberscopes, the side field of an object cannot be effectively viewed. In this invention, improved lens elements adapted for the manufacture of fiberscopes not having the disadvantages described above are proposed.

Still further, conventionally, an optical lens consisting of a solid transparent substance such as glass and synthetic resin and being curved at least one of its opposed two faces has been well known. The principle of such a lens is the utilization of light refraction at the curved face which is an interface between two substances having different refractive indexes. The shape of the curved face can determine such optical characteristics of a lens as the local distance, aberration and the like. Ordinarily, the faces of lenses are finished with definite curvatures by grinding and other finishing means, but the production of a lens with a small aberration requires a precision-made surface finishing apparatus and skilled operation thereof. Especially, in the surface finishing of lenses with a small aperture, such as those having an aperture of less than several millimeters, it is extremely difficult to obtain the desired degree of precision by conventional grinding and other finishing machines, so that small-aperture lenses are made exclusively on the basis of manual production and, even then, those with small aberration have not been easily obtained.

When a gas is caused to flow in a laminar flow within a pipe from one end thereof to the other and the wall of the pipe is heated, the gas in the pipe has such a distribution of refractive indices that it is decreased nearly in proportion with the square of the distance from the center axis of the pipe, said gas having an image forming action like that of a convex lens. This phenomenon is known as the so-called principle of a gas lens, as is described, for instance, in pp. 180–187 of No. 36, Vol. 3, of a magazine "Oyo Butsuri (Applied Physics)." Thus a gas lens capable of functioning as a concave lens can be obtained. However, this gas lens has a number of drawbacks in that it requires the application of external power, is inferior in resolving power, and cannot be reduced to the size of miniature lens; and thus it is not applicable for practical use. Miniature optical lens elements not having the disadvantages of the conventional lens elements are proposed in this invention. On the other hand, various problems for obtaining an extremely small recording element adapted to effectively and simply reproduce any record without necessitating a view finder, an image transmission device having a high resolution, an effective view finder an effective light-beam transmitting long and this conducter, and effective connection parts for said device and conducter could not be easily solved merely by the concept of the conventional optical lens elements. These problems also have been solved in this invention.

SUMMARY OF THE INVENTION

A first object of the invention is to provide an object lens element having a predetermined refractive index distribution established by continuous variation of its refractive index on the internal portion thereof and adapted to manufacture various optical instruments such as fiberscopes, compound lens elements, and optical transmission devices.

A second object of the invention is to provide a miniature optical lens element the aberration of which is caused to be very small without necessitating any curvature finishing of its surface.

A third object of the invention is to provide excellent and miniature fiberscopes not accompanied by the disadvantages of conventional fiberscopes.

A fourth object of the invention is to provide excellent and miniature fiberscopes enabling effective viewing of the side field of an object.

A fifth object of the invention is to provide a novel recording element which can reproduce any record in a simple, accurate and magnified manner without necessitating any view finder.

A sixth object of the invention is to provide an image transmission device which has high resolution ability, is easy in its preservation and handling and is free in vibration and bending of the tr transmission passage of said device and its position of image convertor of said device.

A seventh object of the invention is to provide an improved lens element having a large input or output surface, said element being a conductor having at least one end capable of making any light-beam to be easily incident.

A eighth object of the invention is to provide effective connection parts of a light-beam transmitting device.

The above objects and other objects of the invention have been attained by basically utilizing a novel optical lens element consisting of a transparent body having two end surfaces crossing its center axis and having a refractive index distribution capable of substantially satisfying the following relation.

$$n = N(1 \pm a r^2),$$

where $N$ represents its refractive index at a point on the center axis on a sectional area perpendicular to said center axis, $n$ represents its refractive index at a radial point at a distance r from the former point, and (a) represents a positive constant.

The present invention is based on the fact that glasses, synthetic resins and other solid transparent substances having the above-described refractive index distribution can function as any lens or any composite lens and sufficiently stand practical use. That is, the invention utilizes a principle such that when a light wave progresses through a transparent body having a refractive index gradient varying in a direction crossing the light progressing axis, the light progresses while varying its path toward the direction of higher refractive index.

The objects and various characteristic features of the invention will be described in detail in conjunction with the drawings, in which the same or equivalent members are designated by the same reference numerals and characters.

BRIEF DESCRIPTION OF THE DRAWINGS

FIG. 11 is a partial view of a curved optical lens element according to the invention in which a light-beam transmitting manner is shown;

FIG. 12 is an experimental characteristic curve showing relation between the radius and length of optical lens elements manufactured according to the invention;

FIG. 13 is a schematic view showing other fiberscope manufactured according to the invention;

FIG. 14 is a view showing another principal relation between an object and its image in the optical lens element according to the invention;

FIG. 18 is a graphic view showing the relation between focus distance and lens length of the optical lens element shown in FIG. 17;

FIG. 19 is a view showing the relation between an object and its image in the case where the optical lens element illustrated in FIG. 17 is used;

FIG. 20 (B) is a view showing light-beam transmission in an optical lens element according to the invention, said element having a curved center axis;

FIG. 21 is a view showing light-beam transmitting in an optical lens element according to the invention, said element having the coefficient (a) which varies along the center axis of said element;

FIGS. 22, 23, and 24 are graphic views showing internal refractive index distributions at the sectional areas along planes 22A-22B, 23A-23B, and 24B, respectively;

FIG. 25 is a view showing an example of the optical lens element according to the invention;

FIG. 26 is a graphic view showing the refractive index distribution at a sectional area of the optical lens element illustrated in FIG. 25;

FIG. 27 is a view showing the relation between an object and its image in other example of the optical lens element according to the invention;

FIG. 28 is a schematic view showing a microscope in which an optical lens element according to the invention is applied;

FIG. 29 is a schematic view, partly in section, showing another improved fiberscope according to the invention;

FIG. 30 is a perspective view showing a divided head portion of the fiberscope illustrated in FIG. 29;

FIG. 44 (B) is a schematic view for showing a modification of the example of FIG. 44 (A);

Figure 46:
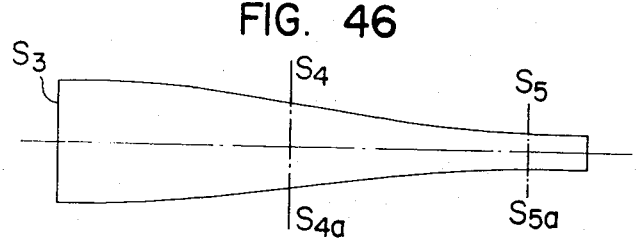
FIG. 46 is a schematic view of a light-beam transmitting conductor according to the invention.
Figure 53:
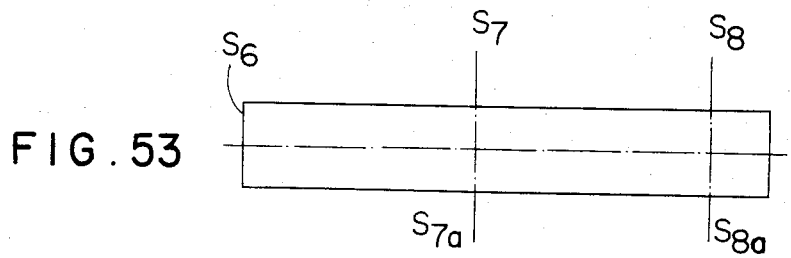
Figure 54:
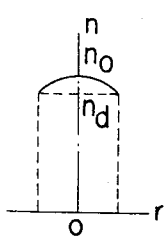
Figure 55:
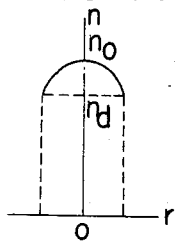
Figure 56:
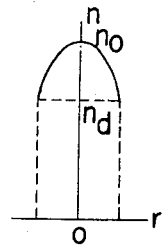
Figure 57:
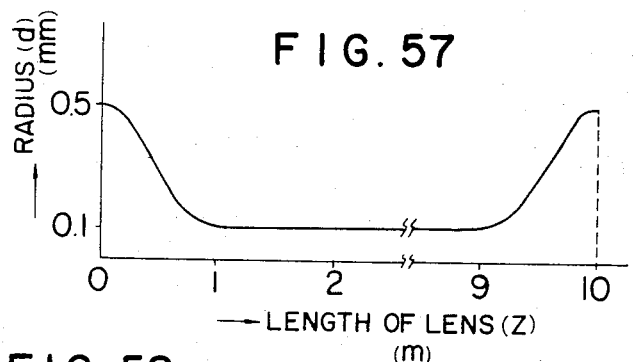
Figure 58:
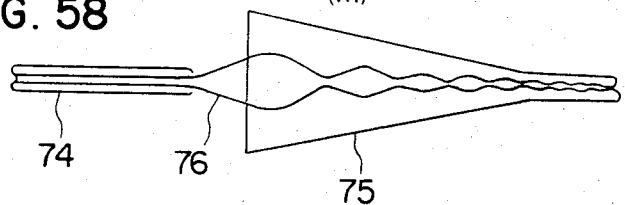
Figure 59:
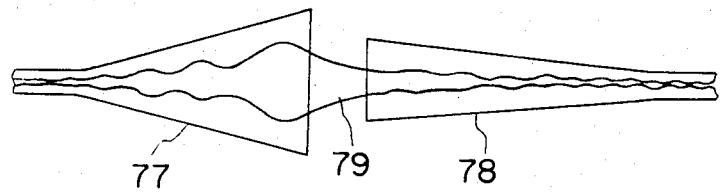

FIGS. (47, 50), (48, 51) and (49,52) show various refractive index characteristics at end surface $S_3$, sectional planes ($S_4 - S_{4a}$) and ($S_5 - S_{5a}$) in FIG. 46, respectively;

FIG. 53 is a schematic view of a modification of the conductor shown in FIG. 46;

FIGS. 54, 55 and 56 show, respectively, refractive index characteristics at end surface $S_6$ and sectional planes ($S_7 - S_{7a}$) and $S_8 - S_{8a}$) in FIG. 53;

FIG. 57 is a view showing relation between radius and length of a glass body according to the invention;

FIG. 58 is a schematic view showing connection part of two lightbeam transmitting conductors according to the invention; and FIG. 59 is a schematic view showing a modification of the connection part illustrated in FIG. 58;

DETAILED DESCRIPTION OF THE INVENTION

Glasses, synthetic resins and the like are most suitable as material for the solid transparent substance having the mentioned refractive index distribution represented by the equation $n = N (1 \pm ar^2)$.

Especially, in the case of a glass, a desired refractive index distribution can be obtained easily by gradually varying the refractive indexes in the interior of the glass by regulating the concentration of cations composing the glass, as is described in the Japanese Pat. No. SHO 43-16986 which corresponds to U.S. Pat. application Ser. No. 806,368 which is now abandoned in favor of continuation application Ser. No. 147,256. In the case of synthetic resin, such a refractive index distribution can be obtained by covering a resinous core member with several kinds of synthetic resins having different refractive indexes, subjecting said covered product to a diffusion at a high temperature and thereafter applying heat thereto to obtain a consecutive variation in the refractive indexes of the resins.

The lens element according to the present invention is equipped with functions of a lens if its refractive index distribution roughly satisfies the above equation. Even when terms such as $r^4$ and $r^6$ are present in the brackets in the right member of said equation, the functioning of the lens element as a lens is not influenced if their coefficients are small.

The following description relates to the case in which the refractive index distribution $n = N (1 - ar^2)$ is adopted.

Figure 1:
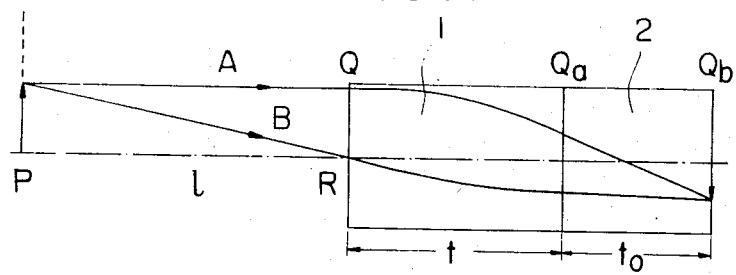
FIG. 1 is a view showing the principal relation between an object and its image in the optical lens element according to the invention.

Now, calculations as to the positions and sizes of images formed by a lens made of a transparent substance having the above refractive index distribution are given below. In FIG. 1, the reference numeral 1 designates a columnar lens having a radius $R$, a length $t$, and a refractive index distribution $n = N(1 - ar^2)$, where $ar^2 << 1$, while the reference numeral 2 represents a transparent substance closely attached to the lens $l$ and having a diameter $R$, a length $t_o$, and a uniform refractive index $n_a$. Relative expressions of paraxial rays are given below when an object p is placed at a position at a distance $l$ from a position Q at a front plane of the lens $l$ and, consequently, a real image is formed at a rear plane $Q_b$ of the transparent substance 2. Rays A entering the lens from its upper end at the position Q and in parallel with the optical axis of the lens $l$, and rays B passing the position at the optical axis of Q from the same start point as the rays A are pursued to obtain their crosspoint.

When the position of the rays A from the optical axis in the lens at $Q_a$ is $X_A$ and angle of the rays A at $A_a$ is taken as $S_A$, a matrix of rays at $Q_a$ is:

$$\begin{bmatrix} X_A \\ S_A \end{bmatrix} = \begin{bmatrix} \cos \sqrt{2a}t & \frac{1}{\sqrt{2a}} \sin \sqrt{2a}t \\ -\sqrt{2a} \sin \sqrt{2a}t & \cos \sqrt{2a}t \end{bmatrix} \begin{bmatrix} R \\ 0 \end{bmatrix}$$

$$= \begin{bmatrix} R \cos \sqrt{2a}t \\ -R\sqrt{2a} \sin \sqrt{2a}t \end{bmatrix}$$

when the position of the rays A in the transparent substance 2 at $Q_a$ is $X_{Aa}$ and its angle is $S_{Aa}$:

$$\begin{bmatrix} X_{Aa} \\ S_{Aa} \end{bmatrix} = \begin{bmatrix} R \cos \sqrt{2a}t \\ \frac{-NR\sqrt{2a}}{n_a} \sin \sqrt{2a}t \end{bmatrix}$$

Therefore, the position $X_{Ab}$ of the rays A at $Q_b$ is:

$$X_{Ab} = (-NR \sqrt{2a}/n_a) \cdot t_o \cdot \sin \sqrt{2a}\, t + R \cdot \cos \sqrt{2a}\, t \quad (1)$$

When the position of the rays B in the lens $l$ at $Q_a$ is $X_B$ and its angle is $S_B$:

$$\begin{bmatrix} X_B \\ S_B \end{bmatrix} = \begin{bmatrix} \cos \sqrt{2a}t & \frac{1}{\sqrt{2a}} \sin \sqrt{2a}t \\ -\sqrt{2a} \sin \sqrt{2a}t & \cos \sqrt{2a}t \end{bmatrix} \begin{bmatrix} 0 \\ -\frac{R}{Nl} \end{bmatrix}$$

$$= \begin{bmatrix} -\frac{R}{Nl\sqrt{2a}} \sin \sqrt{2a}t \\ -\frac{R}{Nl} \cos \sqrt{2a}t \end{bmatrix}$$

When the position of the rays B in the transparent substance 2 at $Q_a$ is $X_{Ba}$ and its angle is $S_{Ba}$:

$$\begin{bmatrix} X_{Ba} \\ S_{Ba} \end{bmatrix} = \begin{bmatrix} -\frac{R}{Nl\sqrt{2a}} \sin \sqrt{2a}\, t \\ -\frac{R}{n_a l} \cos \sqrt{2a}\, t \end{bmatrix}$$

Therefore the position $X_{Bb}$ of the rays at $Q_b$ is:

$$X_{Bb} = (R/n_a l) \cdot t_o \cdot \cos \sqrt{2a}\, t - (R/n_a l\, 2a) \sin \sqrt{2a}\, t \quad (2)$$

If the expression (1) and expression (2) are equal:

$$t_o = \frac{n_a}{N\sqrt{2a}} \cdot \frac{n_o\sqrt{2a} \cos \sqrt{2a}t + \sin \sqrt{2a}t}{n_o l\sqrt{2a} \sin \sqrt{2a}t - \cos \sqrt{2a}t} \quad (3)$$

or $$1 = \frac{1}{N\sqrt{2a}} \times \frac{Nt_o\sqrt{2a} \cos \sqrt{2a}t + n_a \sin \sqrt{2a}t}{Nt_o\sqrt{2a} \sin \sqrt{2a}t - n_a \cos \sqrt{2a}t} \quad (3)'$$

The size $X_{Ab}$ of the image at $Q_b$ is obtainable by substituting the equation (3) into the equation (1).

An end surface of a bundle of optical fibers of the fiberscope is closely attached to the rear plane of the transparent substance 2. When the bundle of optical fibers is directly attached to the lens 1, $t_o$ in the equation (3)' may be replaced by $O$. A condition for an image of an object being infinitely far is obtained by substituting the denominators of the right member of the equation (3)', as follows:

$$n_a = Nt_o \sqrt{2a} \tan \sqrt{2a}\, t \qquad (4)$$

When the transparent substance 2 is composed of air and other fluids, a distance from an object as well as magnification can be adjusted easily by optionally varying the length $t_o$ of the transparent substance. Also, in case there is need for lessening the reflection loss of light at an interface between the transparent substance 2 and lens 1 and at an interface between the transparent substance 2 and the bundle of optical fibers, the refractive index of the transparent substance 2 may approximated to those of the lens $l$ and the bundle of optical fibers or, dispensing with the transparent substance 2, the lens $l$ and the bundle of optical fibers may be closely attached to each other.

In the case of closely attaching the lens to the bundle of optical fibers, it has been confirmed that favorable length of the lens is within the range between $[(m-1)\pi + \frac{1}{2}\pi/\sqrt{2a}]$ and $[(m-1)\pi + 5/6\pi/\sqrt{2a}]$, where $m$ represents a positive integer.

According to the present invention, the surface of objectives used in fiberscopes need not be ground into definite curves, so that lens having both a small diameter and a superior resolution ability are obtainable. Thus, a fiberscope of a small diameter can be materialized and utilized as a borescope and the like to be inserted into narrow cavities for observation.

The following examples 1 to 6 relate, respectively, to the cases in which the lens element according to the invention is applied to a fiberscope.

Example 1

Figure 2:
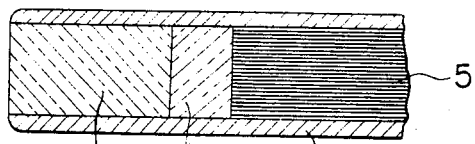
FIG. 2 is a sectional view showing an example of a fiberscope according to the invention.
Figure 3:
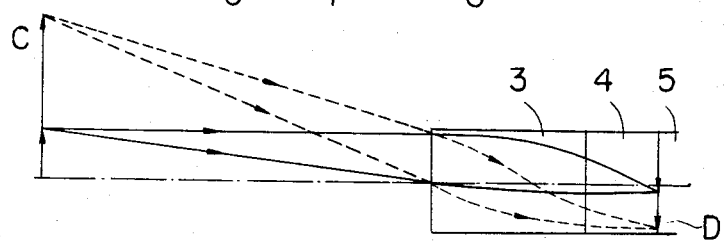
FIGS. 3, 4, 5, 6, 7 and 8 are, respectively, views showing various relations between an object and its image in the optical lens element according to the invention.

A bar of glass with a diameter of 0.08 cm. and composed of 20 wt. percent of $Tl_2O$, 12 wt. percent of $Na_2O$, 20 wt. percent of PbO and 48 wt. percent of $SiO_2$ was immersed in a bath of potassium nitrate at a high temperature for a prescribed length of time, whereby a glass bar showing a center refractive index $n_o$ of 1.60, a surface refractive index of 1.57 and an internal refractive index distribution nearly satisfying the equation $n = N(1 - ar^2)$ was obtained, in said equation $r$ is the distance from a center and $a = 11.7$ cm$^{-2}$. This bar was cut and both of its ends were ground so as to be at a right angle to the bar, whereby to obtain a first glass bar with a length of 0.250 cm. Separately therefrom, a second glass bar having both of its ends ground was prepared and had a refractive index of 1.70, a diameter of 0.08 cm., and a length of 0.099 cm. This second bar was attached to one end of a bundle of optical fibers of a fiberscope with a diameter of 0.08 cm., and, further, the first bar was attached thereto as illustrated in FIG. 2, to complete an objective portion of the fiberscope. In the drawing, reference numeral 3 designates the first glass bar, 4 the second glass bar, 5 the bundle of optical fibers, and 6 protective film. This optical system is illustrated in FIG. 3.

When this fiberscope was employed for actual observation, a range C surrounded by a circle with a diameter of 1 cm. of an object approx. 2 cm. in front of the leading end of the fiberscope was clearly observable. In this instance, an inverted real image D is formed at the end of the optical fiber bundle on the side of the objective.

Example 2.

Figure 4:
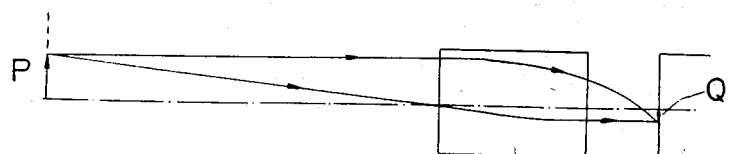
Figure 5:
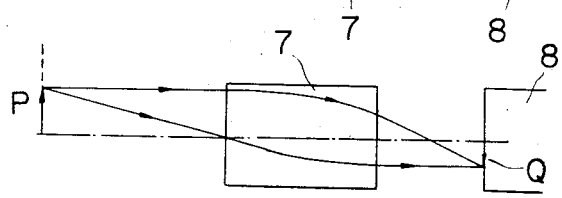

As illustrated in FIGS. 4 and 5, a glass bar 7 which is the same as the first glass bar in Example 1 was placed at an adjustable distance from the end of the bundle of optical fibers 8. According to this fiberscope, a scope with a diameter of 1.6 cm. of an object (P) 2 cm. away was observed clearly when the mentioned distance was set to 0.058 cm. as shown in FIG. 4. When the distance was adjusted to 0.069 cm. as in FIG. 5, a scope with a diameter of 0.5 cm. of an object 1 cm. away was viewed clearly. In either case, the inverted real image (Q) of the object was formed at the end of the bundle of the optical fibers on the side of the objective.

Example 3

Figure 6:
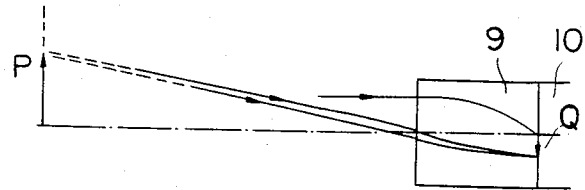

A bar of glass having a diameter of 0.02 cm., a center refractive index of 1.60, a surface refractive index of 1.57, and an internal refractive index distribution satisfying the equation $n = n_o(1 - ar^2)$, where $a = 1.88 \times 10^2$ cm.$^{-2}$, was prepared according to the processing analogous to that in Example 1. In cutting out a lens from this bar, a condition for obtaining the shortest focal distance, that is, the smallest $t_o$ in:

$$\sin \sqrt{2a}\, t_o = l$$

from the foregoing equation (4), was calculated to obtain 0.081 cm. as $t_o$. Then, as illustrated in FIG. 6, a glass bar 9 with a length of 0.081 was attached to a bundle of optical fibers 10, with the result that an object (P) more than 0.5 cm. away was clearly observable. As for an object at a distance of 0.5 cm., a range with a diameter of 0.3 cm. could be seen. An inverted real image (Q) was formed at the end of the bundle of optical fibers.

Example 4

Figure 7:
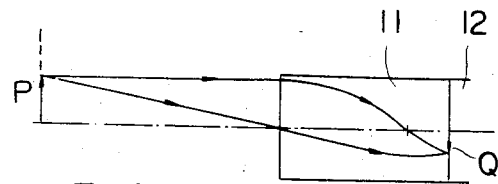
Figure 8:
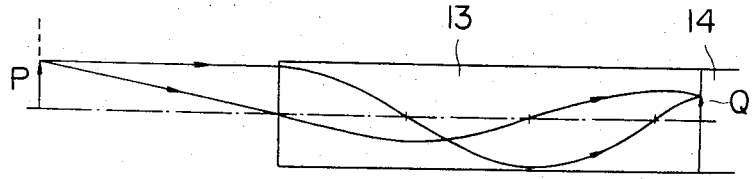

Out of a glass bar material having a diameter of 0.08 cm., a center refractive index $n_o$ of 1.60, a surface refractive index of 1.57, and an internal refractive index distribution satisfying the equation $n = n_o(1 - ar^2)$, where $a = 11.7$ cm.$^{-2}$, a glass bar 11 with a length of 0.378 cm. and having both ends ground perpendicularly to the bar was produced, as illustrated in FIG. 7. When this glass bar as an objective was attached to the end 12 of a bundle of optical fibers, a scope with a diameter of 0.3 cm. of an object (P) 0.5 cm. away could be seen clearly. In this case, too, an inverted real image (Q) was formed at the end of the bundle of optical fibers. Then, as shown in FIG. 8, a glass bar 13 with a length of 1.026 cm. was produced from the above material in the same way and attached to the end 14 of a bundle of optical fibers, then a range with a diameter of 0.3 cm. of an object (P) 0.5 cm. away could be observed clearly as in the former example, with only a difference such that an erect real image (Q) was formed at the end of the fiber bundle.

Example 5

Figure 9:
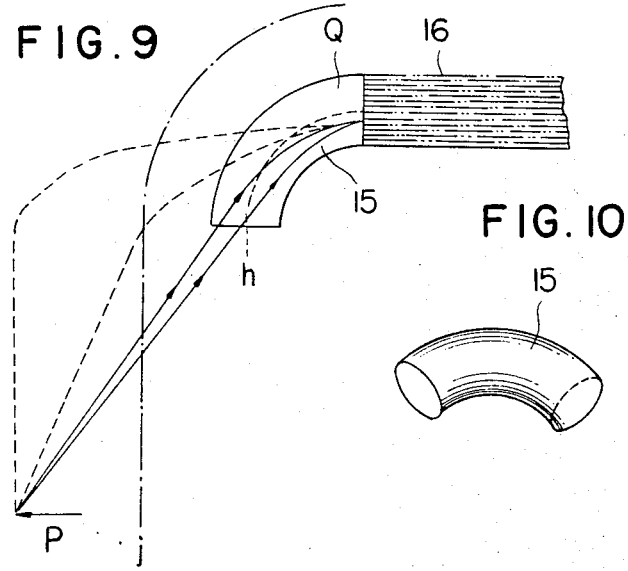
FIG. 9 is a view showing a fiberscope in which a curved optical lens element is utilized.
Figure 10:
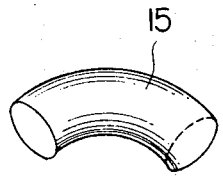
FIG. 10 is a perspective view of the curved optical lens element shown in FIG. 9.

A bar of glass with a diameter of 0.6 mm. and consisting of 48 wt. percent of $SiO_2$, 12 wt. percent of $Tl_2O$ and 20 wt. percent of PbO was prepared and immersed in a bath of potassium nitrate at a temperature of 480°C for 100 hours. The glass bar extracted therefrom was heated up to a temperature of 520°C and curved with a curvature radius of 1 mm. (to a center axis). The bar was then maintained at a temperature of 450°C for 10 hours to remove its internal stress. This bar showed a center refractive index N of 1.60, a surface refractive index of 1.52, and an internal refractive index distribution $n$ nearly satisfying the equation $n = N(1 - ar^2)$, where $a = 0.56$ mm$^{-2}$. This bar was finished into such a shape that its length at the center axis is 20 mm. and its end faces are perpendicular to the center axis. As illustrated in FIG. 9, the objective 15 thus obtained was attached to an end of a bundle of optical fibers 16. The light beam due to an object P placed at a definite position obliquely in front of one end of the objective 15 had formed a real image Q at an end of the fiber bundle. FIG. 10 plots the external view of the objective 15.

The relation between an object and image in case the center axis of the objective is curved as in the foregoing is absolutely the same as the equation (3) established previously with respect to a straight center axis. However, an optical axis is not in agreement with the center axis of the lens element, but is deviated outwardly therefrom by a distance equal to $(2au)^{-1}$, where $u$ is a curvature radius at the center axis of the lens element. In FIG. 9, $h$ designates the center axis of the lens as well as its extension while chain line $j$ represents the optical axis and its extension.

As illustrated in FIG. 11, light beam 15b in the interior of a lens 15a having a curved center axis wanders about its optical axis $j$. When a shift between an optical axis and center axis, e.g., $(2au)^{-1}$, is considerably short as compaed with the radius R of the lens, the light beam can wander or oscillate about the optical axis no matt how long the lens may be, so that an image is transmitted. On the other hand, when $(2au)^{-1}$ is approximately the same as or greater than R, the light beam wandering about the optical axis is emitted out of the lens from the periphery thereof, so that length of the lens has to be less than $\pi (2a)^{1/2}$.

Example 6

Glass consisting of 48 wt. percent of $SiO_2$, 12 wt. percent of $Na_2O$, 20 wt. percent of $Tl_2O$ and 20 wt. percent of PbO was melted in a temperature range of 900°–950°C and extracted at a regulated speed and the a glass substance thus obtained possessed a radii characteristic as shown in FIG. 12. The glass substance was cooled gradually to remove its stress and thereafter immersed in a bath of $KNO_3$ maintained at a temperatures of 460°C. The glass substance was then extracted out of the bath at a regulated speed. The refractive indexes in a cross section of the glass substance thus obtained are distributed in such a manner than $(a)$ is decreased at a certain rate with an increase in diameter and the resulting product was used as an objective in a fiberscope. In FIG. 13, the reference numeral 17 designates an objective obtained in the way described above, 18 a bundle of optical fibers arranged in the same order at both ends thereof, and 19 a glass substance having a refractive index close to those of the objective 17 and bundle of optical fibers 18. A protection glass 20 is provided outside the objective 17. Light led from a light source 21 through a light guide member 22 consisting of a bundle of glass fibers is radiated onto an object 23 to be observed. An image of the object 23 is formed at one end of the bundle of optical fibers 18 by the objective 17, and the same image is transmitted to the other end of the bundle of optical fibers 18. This image is either observed with the naked eye or led to a recording device and the like through an ocular lens 24. According to the present invention, a light-beam which enters through the objective 17 is gradually enlarged in amplitude, so that an image formed at one end of the optical fiber bundle 18 is magnified and superior in resolution. Thus the fiberscope of this invention is suited for the observation of minute portions such as the interiors of somatic cavities.

The following description relates to the case in which the refractive index distribution $n = N(1 + ar^2)$ is adopted.

Now, when the constant $(a)$ is invariable in any cross section, the center axis is straight, and both ends are in a plane perpendicular to the center axis, the relationship between an object and its image in an optical system employing the lens element according to this invention is as follows. in FIG. 14, the reference numeral 1 designates a columnar lens, having a radius R, a length $t$, and a refractive index distribution $n = N(1 + ar^2)$, where $ar^2 \ll 1$. The focal distance $f$ of this columnar lens 1 can be obtained in the same way as that of an analysis as applied to a medium having the above refractive index distribution which is described in pp. 465–467 in the thesis of H. Kogelnik carried in pp. 455–494 of the March, 1965, issue of the Bell system Technical Journal, published in the U.S.A.

More specifically, the focal distance $f$ can be obtained by the following equation, when $(2a)^{1/2} = C$:

$$f = -(NC \sinh ct)^{-1}$$

(5)

However, the focal distance f is represented either by the distance measured toward a space on the side of an object from a first principal point of the lens or the distance measured toward a space on the side of an image from a second principal point. The distance $h$ of a corresponding principal plane $H_1$ or $H_2$ as measured inwardly from the end faces of the lens is represented by:

$$h = (NC)^{-1} \tanh \tfrac{1}{2} ct$$

(6)

In FIG. 14, F1 and F2, respectively, designate the positions of focal points on the sides of the object and image, while H1 and H2 represent principal planes on the sides of the object and image.

When an object P is placed in a space on the side of the object at a distance $k$ from the principal plane H1, an image Q is formed at a position in a space on the image side at a distance $l$ from the principal plane H2. In this case, paraxial light-beams are such that the equation:

$$k^{-1} + l^{-1} = f^{-1}$$

is established between the distance $k$ of the object and the distance $l$ of the image, in the same way as in an ordinary lens formula.

Figure 15:
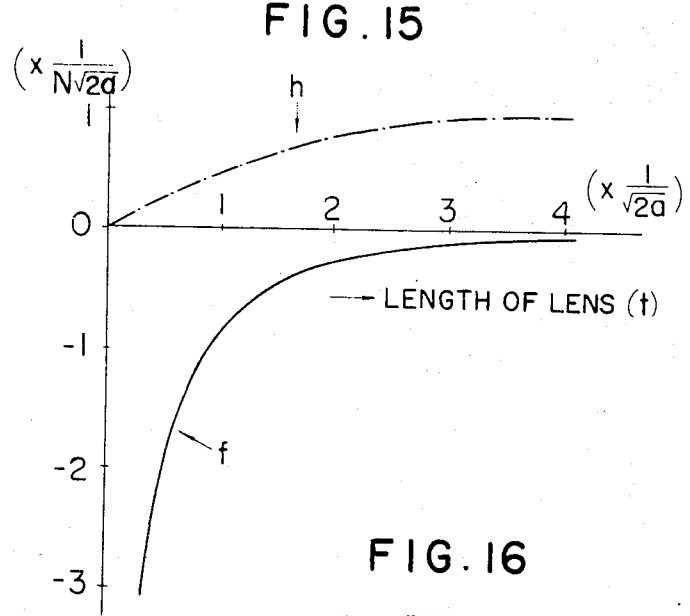
FIG. 15 is a graphic view showing the relation between focus distance and lens length of the optical lens element shown in FIG. 14.

Equation (5) of the focal distance and equation (6) of the principle plane distance $h$ are represented in FIG. 15 as functions of the length of the lens, where the axis of the abscissa represents the length of the lens while the axis of ordinates represents the focal distance and principal plane distance. The full line designates the f focal distance f and the chain line represents the principal plane distance h. The focal distance is varied from negative infinity to zero along with increase in the length of the lens. And the principal plane distance is varied from zero to $(NC)^{-1}$ along with increase in the length of the lens. Therefore, when, for instance, the principal plane and focal point on the side of the image are considered, the principal plane on the side of the image is always placed inwardly from the end face on the side of the lens irrespective of the length thereof, while the focal point on the side of the image is always placed inwardly from the end face on the side of image and farther than the principal plane on the side of the image.

Figure 16:
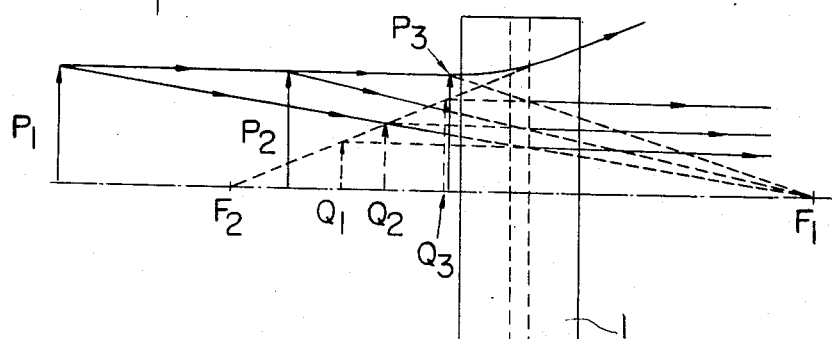
FIG. 16 is a view showing the relation between an object and its image in the optical lens element shown in FIG. 14.

FIG. 16 plots variation of image position in the case of changing position of the object. When the object is moved from P1, P2 to P3 in the drawing, its image due to the lens l is changed from Q1, Q2 to Q3. The parallel light beams from the object side said light beams being, are dispersed, but when said light beams are extended in the opposite direction, they are converted at one point at the position of F2. The parallel light beams from the image side also form their focal point at F1 at a position symmetrical to F2 with respect to the lens. When the object moves toward P3 from P1, an erect virtual image is formed which is gradually enlarged from Q1 to Q3.

Now, in FIG. 16, the variation of an image is considered as the length of the lens is varied. In this case, F2 is moved in the right hand direction and F1 in the left hand direction when length of the lens is made greater, so that the image always appears as an erect virtual image though it decrease in size thereof.

Two end faces of the lens according to the present invention ordinarily have planes perpendicular to the center axis thereof. When the end faces are out of perpendicular, the optical axis assumes a certain angle relative to the extension of the center axis.

The lens element of the invention is ordinarily circular in cross section, but may be of polygonal and other forms, and the size and shape of the cross section may vary along the center axis without any accompanying drawbacks.

For an optical system to be composed of a plurality of lens elements according to the present invention, it will be most convenient to attach the end faces of the lenses with a transparent bonding agent having a given refractive index. And for the interposition of blank spaces in the combination of the inventive lens elements, an integral structure may be obtained by joining the end faces through a transparent rod-like member having a constant refractive index distribution.

The lens of the invention may have chromatic aberration due to dispersion as in ordinary optical lenses, but such a chromatic aberration can be reduced to a certain extent by combining with the lens of the invention a lens element having a different rate of dispersion and a negative coefficient ($a$) of refractive index gradient.

Since the instant optical lens element is permitted to function as a lens due to the distribution of refractive indexes in the interior, curvatures of the end faces need not be finished. According to the present invention, therefore, a grinder required conventionally for the production of prior curved optical lenses can be dispensed with and, moreover, lenses including those having less than several millimeters of aperture and also having a small aberration can be produced at extremely low cost.

Also, in the instant optical lens element, the focal distance can be varied only by changing its length in axial direction, so that lenses having different optical characteristics determined solely by their lengths can be obtained by cutting out lenses of different lengths from the same lens material having a certain refractive index distribution.

Furthermore, since the instant optical lens element is made of a solid transparent substance, a refractive index distribution once determined is maintained without fluctuation. As compared with conventional gas lenses which require the application of external power, are unstable, and are difficult to produce in small sizes, the lenses proposed by the present invention do not require the application of any external force, are stable in performance, and small in size.

The lens element according to the invention can find a wide field of application in optical instruments such as microscopes, telescopes, other means for optical image transmission and various optical measuring devices.

The following Example 7 is based on the lens element according to FIGS. 14, 15 and 16.

EXAMPLE 7

A bar of glass with a diameter of 0.5 cm. and consisting of 30 wt. percent of $K_2O$, 14 wt. percent of $Na_2O$, 7 wt. percent of $B_2O_3$ and 49 wt. percent of $SiO_2$ was immersed in a bath of thallium chloride at a high temperature for a given period of time, whereby a glass bar having a refractive index $N$ at a center of 1.50, a surface refractive index of 1.57, and a refractive index distribution nearly satisfying the equation $n = N(1 + ar^2)$, where $r$ is a distance from a center and $a = 0.75$ mm$^{-2}$ was obtained. This bar was cut to obtain columnar lenses with lengths, respectively, of 0.84 cm., 1.68 cm. and 2.45 cm. and whose end faces are planes so as to be perpendicular to their center axes. It was confirmed that these columnar lenses can function as concave lens with focal distances, respectively, of −4.5 mm., −1.4 mm. and −0.54 mm.

In the following, relationship (that is, focal distance) between an object and its image will be described in detail in connection with the case in which $n = N(1 - ar^2)$ is adopted.

Figure 17:
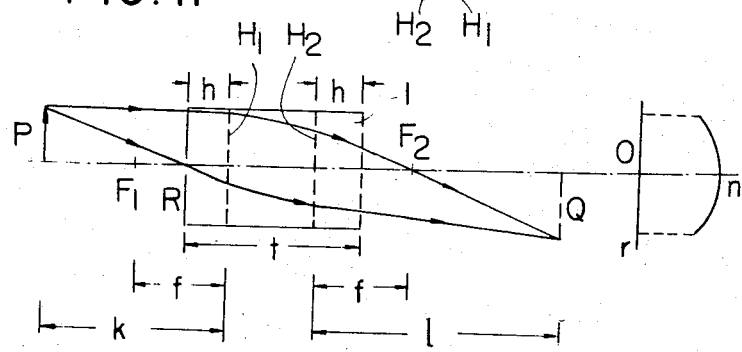
FIG. 17 is a view for showing FIG. 5 in a more detailed manner.

When it is assumed that the constant ($a$) is invariable in any cross section, the center axis is straight, both ends are in planes perpendicular to the center axis, then the relationship between an object and its image in the lens element according to this invention is as follows. In FIG. 17, the reference numeral 1 designates a columnar lens, having a radius R, a length $t$, and a refractive index distribution $n = N(l - ar^2)$, where $ar^2 \ll 1$.

The focal distance $f$ of this columnar lens $l$ can be obtained in the same way as in the case of equation (5). More specifically, the focal distance f can be obtained by the following equation, when $(2a)^{one\text{-}half} = C$:

$$f = (Nc \sin ct)^{-1}$$

(7)

However, the focal distance $f$ is represented either by a distance measured toward a space on the object side from a first principal point of the lens or a distance measured toward a space on the image side from a second principal point. And, the distance $h$ of a corresponding principal plane H as measured inwardly from end faces of the lens is represented by:

$$h = (NC)^{-1} \tan \tfrac{1}{2} ct \qquad (8)$$

In FIG. 17, F1 and F2 respectively designate the positions of focal points on the sides of the object and image, while H1 and H2 represent principal planes on the sides of the object and image.

When an object P is placed at a position in a space on the side of the object at a distance $k$ from the principal plane H1 on the object of lens $l$, and, consequently, an image Q is formed at a position in a space on the side of the image at a distance $l$ from the principal plane H2 on the image side of the lens, paraxial light-beams in this case are such that the equation $$K^{-1} + l^{-1} = f^{-1} \qquad (9)$$

is established between the distance $k$ of the object and the distance $l$ of the image, in the same way as in an ordinary lens formula.

Said equation (7) of the focal distance and the equation (8) of the principal plane distance $h$ are shown in FIG. 18 as the functions of the length of the lens. The axis of abscissa in the graph plotted in the drawing represents the length of the lens, while the axis of ordinates represents the focal distance and principal plane distance. The full lines designate the focal distance $f$, and the chain lines represent the main plane distance $h$. The focal distance is varied in a range of $(NC)^{-1}$ to infinity, or $-(NC)^{-1}$ to negative infinity, according to the length of the lens. When the length of the lens is limited to a range from $(2C)^{-1}\pi (2m - (5/3)$ to $(2C)^{-1}\pi [2m - (1/3)]$, where $m$ is a positive integer, the focal distance adopts values between $(NC)^{-1}$ and $2(NC)^{-1}$ or between $-(NC)^{-1}$ and $-2(NC)^{-1}$. Accordingly, a lens having a length in the above range can afford an extremely small focal distance. Furthermore, as is seen from the drawing, the lens has a focal point outside itself at a portion where the full lines $f$ are higher than the chain lines $h$, that is, when the length of the lens adopts a value from $$(2C)^{-1} (2m-2) \text{ to } (2C)^{-1} (2m-1).$$

FIG. 19 shows relative variation between the image and object when the position of the object is changed. When the object is moved from P1, P2 to P3 in the drawing, its image due to the lens $l$ is changed from Q1, Q2 to Q3. The parallel light beams from the object side, said beam being in parallel with the axis, are converged at one point at the position of the focal point F2. The parallel light beams from the image side are focused at a focal point F1 at a position symmetrical to the lens. When the object is moved from P1 to P2, an inverted real image is formed, increasing gradually as it moves from Q1 to Q2. When the object is moved to P3 located on the inner side of F1, its image becomes an erect virtual image Q3.

Figure 20A:
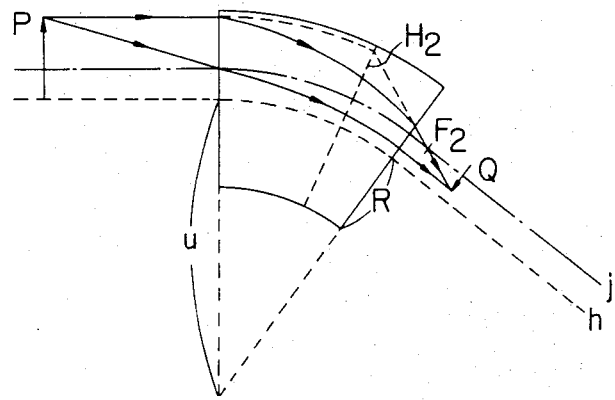
FIG. 20 (A) is a view showing in detail a part of a curved lens element according to ne invention.

Now, optical system of the case, in which center axis of the lens element according to the invention is bent, will be described hereinbelow. In this case, let it be assumed that the constant $a$ is positive and all sectional areas of the same lens element, and both end surfaces of the element, are flat planes perpendicular to said center axis. In FIG. 20 (A), a lens element having a shape resembling a curved cylinder having a length $t$ along its center axis bent to a curvature U. This lens element has a radius R and a refractive index distribution represented by the equation $n = N (l - ar^2)$, as described already in detail, where $ar^2 << 1$. Referring to FIG. 20 (A), if a light beam near the center axis is considered in connection with the case where an object P is set at a front position on the extension of the center axis and an image Q in formed at rear position extended from the center line and the condition $(2a)^{one-half} = C$ taken, the same equations as the equations of through 9 in the case of lens element having straight center axis are established. Of course, however, the optical axis of the lens element does not coincide with the center axis of the lens element and deviates by a distance of $(2aU)^{-1}$ toward the outside. In FIG. 20 (A), the broken line $h$ represents the center axis of the lens element and its extension and the chain line $j$ represents the optical axis of the lens element and its extension. Furthermore, $f, h, k$ and $l$ in the equations 7, 8 and 9 are respectively distances measured along the optical axis and its extension.

Even when the curvature radius of the curve of the center axis of the lens is varied in the length direction of the lens, the relative positions of an object and image as well as magnification are the same as in the foregoing, and only an optical axis at the curved portion is shifted from the center axis. This state is shown in FIG. 20 (B), where the dotted line represents the part of the optical axis which is deviated from the center axis and the image of an object P is transmitted through a fibrous transparent substance 25 to form an image Q.

Now, considering a case in which the lens element according to this invention has such a refractive index distribution that the constant ($a$) varies along its center axis, let it be assumed that axis Z is taken along the center axis, one end of the lens corresponds to $Z = O$ and the other end thereof corresponds to $Z = Za$, and $a$ at an arbitrary portion corresponds to a ($Z$). FIG. 21 plots the relationship between an object and its image on the assumption that the object is placed onto an end side where $Z = O$ of a lens element having such a refractive index distribution that $a$ decreases with increase in Z for instance, $a (Z) = a (O) (l-Z)$, where $X$ is a position constant and $Z2 < l$. FIGS. 22, 23 and 24 represent refractive indexes at cross section 22A–22B, 23A–23B, and 24A–24B in FIG. 21. The light-beam in the interior of the lens progresses while oscillating in its amplitude and wave length which are gradually increased, so that the lens can afford a higher degree of resolving power and higher magnification as compared with lenses having constant $a$. Desirably, the size of the cross section of a lens in which $a$ decreases with increase in Z should be increased with the increase of Z because the brightness of an image obtained thereby can be augmented by preventing the impingement of light to the lateral side of the lens.

Both end faces of a lens element according to this invention have ordinarily a plane perpendicular to the center axis of the lens at its end. When the end faces are out of perpendicular, the optical axis of the lens comes to have a certain angle to the extension of the center axis.

The inventive lens element is ordinarily circular in cross section, but may be of polygonal and other forms, and the size and shape of the cross section may very along the center axis without accompanying any drawbacks.

For an optical system to be composed of a plurality of lens element according to the invention, it will be most convenient to attach the end faces of the lenses with a transparent bonding agent having a given refractive index and for the interposition of blank spaces in the combination of the inventive lens elements of the invention, an integral structure may be obtained by joining the end faces through a transparent rod-like member having a uniform refractive index.

Among the optical lens elements according to the invention, particularly the lens element, in which the length of the center axis between both end surfaces is longer than $(2a)^{-one-half}$ and its constant $a$ is positive, has a function equal to that of a lens assembly obtained by a combination of a plurality of conventional optical lenses. Comparing the former lens element according to the invention with the latter lens assembly, it has been confirmed that the lens element according to the invention, because of its one body, does not necessitate troublesome matching of optical axis of the plural lenses and their assembling, and is low in its reflection loss.

The lens element having a bent center axis and the positive constant $a$ has a function of bending light beam, whereby any image can be formed along extension of the bent center axis. Accordingly, it is possible to form an image at bent position without using any reflection mirror and other optical elements.

In the following, examples 8 to 11 based on the lens element according to FIGS. 17, 18 and 19 will be described.

EXAMPLE 8

A bar of glass with a diameter of 0.5 cm. and consisting of 30 wt. percent of $Tl_2O$, 14 wt. percent of $Na_2O$, 7 wt. percent of $B_2O_3$ and 49 wt. percent of $SiO_2$ was immersed in a bath of potassium nitrate at 500°C for 20 days, whereby a glass bar having a refractive index at a center of 1.57, a refractive index at a surface of 1.50, and a refractive index distribution in a cross section of $n = N(1 - ar^2)$, where $r$ is a distance from a center and ($a$) satisfies substantially the equation $a = 0.75$ cm.$^{-2}$ was obtained. This bar was cut to obtain a disc with a length of 0.30 cm. both end faces of which were ground flatly so as to be perpendicular to the center axis of the bar. As illustrated in FIG. 25, the disc 1 was placed at a distance of 0.5 cm. from an object P, which was then viewed with bare eyes through the disc with a result that an erect virtual image magnified by approx. 1.6 times was observed. FIG. 26 shows the internal refractive index distribution of the disc.

EXAMPLE 9

Two lenses which were made in a way similar to that of the Example 8 and a glass bar with a uniform refractive index were joined together by means of a transparent bonding agent having a refractive index close to that of the glass, as shown in FIG. 27. The reference numerals 27 and 28 designate lenses while 26 represents the glass bar. A real image Q of an object P was formed in the glass bar 26, as illustrated in the drawing, by properly selecting the thickness or length of each of the lenses and glass bar. The real image Q appears as a virtual image $Q_a$ magnified by the lens 28. Such a combination can be utilized as a compact and simplified microscope.

EXAMPLE 10

The embodiment of the invention illustrated in FIG. 28 is a schematic representation of a structure of a microscope where a lens element according to the present invention is employed as an objective. The microscope includes a lens element 29 and Kellner type ocular lens 30. A lens element having the aforementioned refractive index distribution and having a diameter of 0.5 mm. and $a$ of approx. 1,000 cm$^{-2}$ is applicable as the lens element 29. Accordingly, the forcal distance can be made about 0.2 mm., and a longer focal distance can be obtained at will by varying the length of the lens or the value of $a$. The lens element 29 and ocular lens 30 are adjusted so as to have a common optical axis 32–32a. The movement of the lens element 29 and the relative positions of the lens element 29 and ocular lens 30 are the same as in prior microscopes, and a viewer can observe the mignified real image 34 of a desired portion 33 of a sample 31 as a magnified virtual image 34a by means of the ocular lens 30.

In general, there are occasional needs for observation not only of a forward direction which is an extension of a center axis of a fiberscope at its leading end but also of lateral directions. An ordinary method employed to attain this aim of lateral viewing is to provide a reflection mirror or prism exclusively for that purpose at the front end of an object lens in order to change a direction of image transmission. However, such a structure requires a complex fixing mechanism and can be a cause for hampering the materialization of a small-diameter fiberscope.

According to the present invention, the above-mentioned lateral field observable fiberscope can be easily obtained by improving the fiberscope illustrated in FIG. 2 so that plural object lenses according to the invention are provided in parallel at the tip end of an optical conductor consisting of fiber bundle. This improved fiberscope is illustrated in FIGS. 29 and 30.

Figure 31:
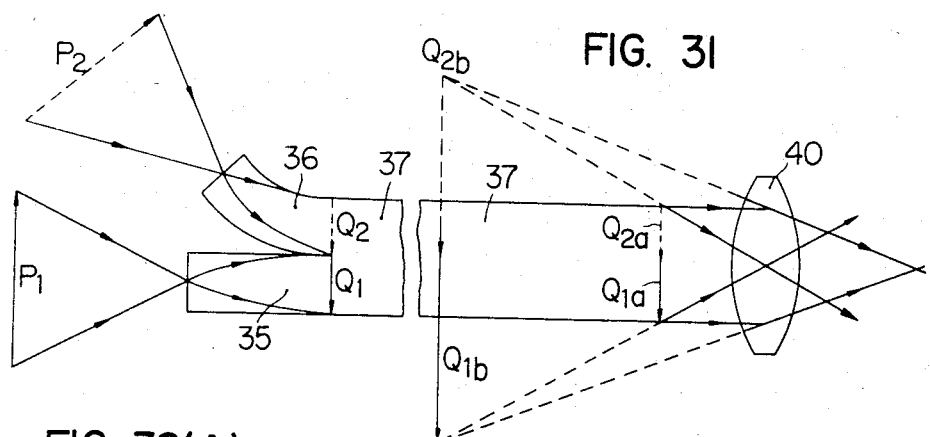
FIG. 31 is a view showing the relation between an object and its image in the fiberscope illustrated in FIG. 29.

Referring to FIGS. 29 and 30, a columnar object lens 35 having the aforementioned refractive index distribution and a straight center axes and an object lens 36 having the above refractive index distribution and a curved center axis are closely juxtaposed at an end of a bundle of optical fiber bundle 37. The reference numeral 38 designates a light transmitting fiber bundle for the illumination of an object, 39 a protective covering, and 40 an ocular lens. The relationship between an object and its image is plotted equivalently in FIG. 31, where an image of an object P1 placed in front of a leading end of a fiberscope has its real image Q1 formed at an end of a bundle of optical fibers through the lens 35, while an image P2 of an object placed in a lateral direction has its real image Q2 formed at an end of the bundle of optical fibers through a lens 36. The real images Q1 and Q2 are thereafter transmitted to the other end of the optical fiber bundle 37 and these images $Q_{1a}$ and $Q_{2a}$ are observed as virtual images $Q_{1b}$ and $Q_{2b}$ magnified by the ocular lens 40 provided at the other end.

The lenses 35 and 36 may not necessarily be attached to an end face of the fiber bundle 37, but a hollow space may be provided between the lens 35 or 36 and the fiber bundle 37 or a transparent substance of a uniform quality may be filled therein.

According to the present invention, the faces of objectives used in fiberscopes need not be ground into definite curves, so that lenses having both a small diameter and a superior degree of resolution are obtainable. And thus a fiberscope is having a small diameter and permitting the simultaneous observation of images in different directions can be realized. Such a fiberscope is especially applicable as a borescope to be inserted into narrow cavities for observation.

Of the objectives used in the fiberscope of the present invention, that which has a straight center axis can be produced according to a process such as the following:

A bar of glass with a diameter of 0.08 cm. and consisting of 20 wt. percent of $Tl_2O$, 12 wt. percent of $Na_2O$ 20 wt. percent of PbO and 48 wt. of $SiO_2$ was immersed in a bath of potassium nitrate at a high temperature for a definite period of time, whereby a glass bar having a center refractive index N of 1.60, a surface refractive index of 1.57, and an internal refractive index distribution nearly satisfying $n = N (1 - ar^2)$, where $r = a$ corresponds to radial distance from the center, and $a = 11.7$ cm.$^{-2}$ was obtained. This glass bar was cut and both of its ends were planed so as to be perpendicular to the bar into a length of 0.378 cm., to obtain a glass bar which is employed as an objective.

Furthermore, of the objectives used in the fiberscope of the present invention, that which has a curved center axis can be obtained according to a process such as described in the Example 5.

Figure 32A:
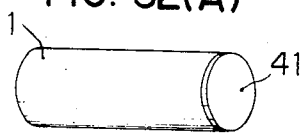
FIGS. 32 (A and B) is a perspective view showing a principal structure of a recording element according to the invention.
Figure 32B:
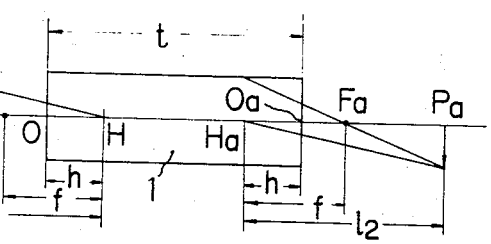

The above-mentioned particular lens element according to the invention can be effectively utilized as a recording element for reproducing, simply, correctly and magnifyingly, any pattern which has been recorded in a very small element. This recording element can be easily manufactured by attaching a photosensitive film 41 onto one end face of the particular lens element 1 according to the invention, as shown in FIG. 32.

The coating of a photo-sensitive film to an end face can be effected according to a process employed ordinarily for the coating of dry-plates for photographic use. The recording to the recording element according to the present invention must be effected in such a manner that an image of an object placed in front of a rod-shaped lens member 1 is formed on a sensitive film surface 41 on its end face.

Since condition necessary for an image to be formed on the end face of the lens is $\frac{1}{2} = h$ in FIG. 17, a distance PO between the position of the object P and the end face O on the object side is, according to the equation (7), (8), (9):

$$\overline{PO} = -(1/N \sqrt{2a}) \tan ( \sqrt{2a}\, t)$$

The magnification in this instance is: $m = -\cos ( \sqrt{2a}\, t)$. (10)

From the foregoing conditions, the distance PO between the lens member and the object required for its image to be formed on the end face of the lens is determined if $N, a, t$ are known in the equation (10). When $N$ and $a$ are determined, the distance PO is varied according to variation in the length $t$ of the rod-shaped lens member. Although the foregoing equation presupposes the same constant $a$ in the cross sections of the rod-shaped lens member which are perpendicular to its center axis, light beams entering into a rod-shaped lens member from one of its end faces can be focused on the other end face even when the cross sections of the rod-shaped lens member have different values of a. It is therefore also possible, as shown in FIG. 32, to obtain a recording element having the same object as the present invention by coating a photosensitive film 41 on one end face of a rod-shaped lens element 1 having such a refractive index distribution as proposed in this invention. An image of an object placed at such a position as satisfies the condition of the above equation (10) enters the recording element from its end face O and formed on the other end face, giving exposure to the photo-sensitive film provided thereon. The exposed film is thereafter subjected to a process of development so that the image is fixed on the film surface. The rod-shaped lens member of the present invention can be produced in extremely small diameters, for instance that of less than 1 mm, so that an image can be formed on an end face of a rod-shaped lens member having an extremely small diameter. For the magnification of a recorded image to its original size, a luminescent element is disposed at the back of the photo sensitive film of the recording element and light-beam is made to progress through the rod-shaped lens member in the direction reverse to the light beam direction in the case of recording, whereby projection of the recorded image onto a screen can be attained. The is to say, the rod-shaped lens member serves as a projector lens projecting the recorded image in a state magnified into its original size. This is one of the most important characteristics of the recording element of the present invention. According to the recording element, images can be reproduced accurately, because the same lens used for the recording thereof is also used for their magnification. It is needless to say that images can be reproduced in any desired size if an auxiliary lens is provided additionally.

A concrete example of a process of obtaining the recording element of the present invention is given below.

A bar of glass with a diameter of 0.08 cm. and consisting of 20 wt. percent of $Tl_2O$, 12 wt. percent of $Na_2O$, 20 wt. percent of PbO and 48 wt. percent of $SiO_2$ was immersed in a bath of potassium nitrate maintained at a temperature of 460°C for 48 hours, whereby a glass bar having a center refractive index N of 1.60, a surface refractive index of 1.57, and an internal refractive index distribution nearly satisfying the equation $n = N (1 - ar^2)$, where $r$ represents a distance from a center and $a = 11.7$ cm$^{-2}$ was obtained. This bar was cut to obtain a bar with a length of 0.378 cm. and both end faces of this cut bar was planed so as to be perpendicular to the axis of the bar. By coating a photo-sensitive film 41 on one end of the bar, a recording element capable of photographying a range with a diameter of approx. 0.3 cm. at a distance of approx. 0.5 cm. was obtained.

The recording element of the present invention is of an ultrasmall size and provided with a sensitive film attached integrally to the lens body, so that the invention recording element can reproduce recorded in a highly exact manner, does not require much space for storage and can be easily manufactured.

The recording element can find an unlimited range of applications thereof due to the above-described characteristics.

Figure 33:
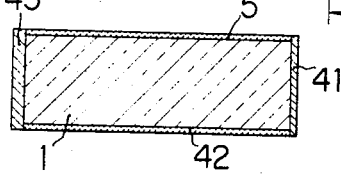
FIG. 33 is a schematic view, in vertical section, showing a micro-camera in which the recording element illustrated in FIG. 32 is utilized.
Figure 34:
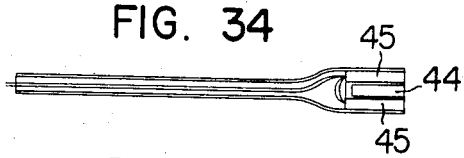
FIG. 34 is a schematic view, in vertical section along length-wise direction, showing a principal part of a camera adapted to photograph internal organs of a human body, in which a recording element according to the invention is utilized.

For instance, an ultrasmall camera may be produced by the provision of a shutter to an end face of light incidence of the recording element, or a celiac photographing device may be made by combination of the inventive recording element with a light source for illumination. FIG. 33 illustrates an ultra-small camera, in which 1 represents a rod-shaped lens member according to the invention, 41 a photo sensitive film, 42 a light insulating layer, and 43 a shutter section. FIG. 34 shows an essential part of a celiac photographing device, in which 44 designates a recording element and 45 a luminescent diode.

The particular lens element according to the invention can be effectively applied to any image transmitter. Ordinarily, for the transmission of an image between two arbitrary points, there has been a method of disposing one or more lenses midway between two image converters or, in special cases, employing a bundle of optical transparent fibers having a uniform internal refractive index and effecting the transmission of an image as differences in the brightness of light by making each of said fibers correspond to each of the points made by resolving the image.

However, when the former is employed in a path of image transmission, positions of the two image converters are fixed when the positions of the lenses of the transmission system are determined, so that arrangement of the transmission system has to be corrected each time when it is shifted due to any mechanical vibration or when the image converters have to be relocated. In the case of the latter, on the other hand, light transmission is effected without trouble even when the transmission path is vibrated or bent.

However, the individual fibers composing the bundle of optical fibers of the transmission path can resolve only an image into points corresponding thereto and transmit light quantity of each of the points, so that the resolving degree of such an image transmitter is mostly determined by the number of fibers per unit cross sectional area, e.g., by the diameter of each fiber. Although a resolving degree can be improved to a certain extent by decreasing the diameter of the fibers, there is a limit in the diameter of producible optical fibers. It is therefore highly possible for the image resolving power of the image transmitter to deteriorate, whereby quality of a picture transmitted thereby is degraded. Further, a bundle of optical fibers are produced ordinarily by weaving optical fibers with a diameter of approx. 10 microns and thereafter bundling them into a bundle in such a manner that both ends of the tens of thousands of fibers are arranged in the same order, so that these processes are very complex and require a prolonged period of labor and technical skill.

These problems can be overcome principally by the use of a gas lens, as is described in the thesis of Aoki and Suzuki, pp. 2 – 8 of the January, 1967, issue of the U. S. technical magazine "IEEE Transactions on Microwave Theory and Techniques." In practice, however, bulky apparatus is needed in order to employ such a gas lens whereupon the maintenance and operation thereof involve much difficulty moreover, lenses of high quality are hard to obtain due to the irregularity in refractive indexes in the gas under the influence of gravity. Thus the gas lens has a number of difficult problems to be solved before being applied to practical use.

According to the invention, an image transmitter not having the disadvantages as described above has been proposed, said image transmitter comprising a transmission path consisting of a fibrous transparent substance and an image converter provided at least at one end thereof, said fibrous transparent substance having a refractive index distribution in a cross section perpendicular to the center axis thereof, said distribution satisfying substantially the equation:

$$n = N (1 - ar^2)$$

where N is a refractive index at a point of the axis, $n$ is a refractive index at a distance $r$ from the point, and ($a$) is a positive constant.

Glass, synthetic resin and the like are most suitable as material for the fibrous transparent substance of the image transmitter according to the invention. Especially, in the case of glass, a desired refractive index distribution can be obtained easily by gradually varying the refractive indexes in the interior of the glass as in the case of the lens element described already.

As described already in connection with FIGS. 8, 9, 11 and 20, light-beams entering the transparent substance are transmitted therethrough because the transparent substance is a lens system.

By placing image converters at the end faces of the transparent substance, an image on the side of one image converter can be transmitted and projected into the other image converter. In this instance, long or curved, the transparent substance being a transmission path may be or even though its position may be deviated due to vibration, an image can be transmitted without being disturbed so far as the relative positions of its ends and the two converters are fixed. Thus, an image transmitter having a high resolving power can be obtained.

Figure 35:
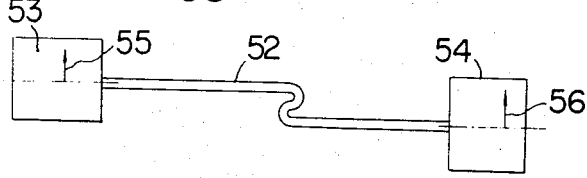
FIG. 35 is a schematic view showing an example of an image transmission device according to the invention.

A preferred embodiment of the above-mentioned image transmitter is shown in FIG. 35; in which there are provided a fibrous transparent substance 52 permitting passing of light in a longitudinal direction and having a refractive index gradient in its cross section, said refractive index gradient being such that gradual decrease in refractive index is observed from a center of the cross section toward a periphery nearly in proportion with the square of distance from the center; a first image converter 53 connected to input end face of said substance 52 and adapted to convert an image in such a manner that the image is transmitted in the state of being as bright as possible and is neither diverted nor reflected in the transparent substance; and a second image converter 54 connected to another end face of said transparent substance and adapted to project a transmitted image.

The image converter 53 implies optical means such as an optical lens and prism, a device such as a cathode-ray tube capable of converting an electric signal into an optical image, and means for the amplification of the brightness of an image. And the image converter 54 implies optical means such as an optical lens and prism, a device such as an image orthicon capable of converting an optical image into electric signal, and means for amplification of brightness of an image.

An image 55 to be transmitted is transmitted through the transparent substance 52 after being converted by means of the first image converter 53 in such a manner as to pass the transparent substance 52 in the state of being as bright as possible and without being diverted or reflected. This image transmitted through the transparent substance 52 is projected as a real image by the second image converter 54, to obtain an image 56.

Now, since the transparent substance 52 is equivalent to a lens element as described already, the transparent substance 52 may function both as a transmission path and as one of the image converters 53 and 54.

The transparent substance 52 may not be one continuous body but may be severed and separated at several places, or combined from several of such transparent substances having different refractive index gradients, so far as an image transmitted therethrough is not scattered midway.

That is, such a transparent substance functions as a lens not only when the $a$ has a definite value in cross sections with respect to the center axis thereof but when the $a$ is varied along the center axis. Especially, fibrous transparent substances having such a refractive index distribution that the $a$ is decreased gradually from one end thereof to the other can afford a higher degree of magnification as compared with those in which the $a$ has a definite value.

The word "fibrous" in this invention suggests a considerable length as compared with the size of a cross section irrespective of the shape of the cross section. The word, therefore, includes also the meaning of the word "rod-shaped."

The image transmitter according to the present invention can be utilized in optical devices such as borescopes and fiberscopes having a relatively long light conducting portion for image transmission. Description on the optical device for microscopic inspection is given in the following.

The optical instrument having its light conducting portion for image transmission comprises the above described fibrous transparent substance and a lens which is provided at least at one end face of the transparent substance. At the end of the transparent substance on the side of an image there is provided an ocular or other magnifying lens by which a real or virtual image formed near the end is magnified. Though provision of another lens at the end of the transparent substance on the side of an object is not always necessary, since the transparent substance functions as a lens, an objective or other optical elements may be provided additionally.

The light conducting portion for image transmission may be composed not necessarily of one fibrous transparent substance but of a fibrous transparent substance consisting of a bundle of plural fibers. For instance, the diameter of a transparent substance must be reduced to a certain extent in case flexibility is required for the light conduction portion for image transmission and then the provision of a bundle of transparent fibers will be appropriate to compensate for the loss of brightness of an image due to the reduced diameter. However, the transparent fibers thus bundled should be arranged in the same or substantially the same order at both ends thereof.

Since the light conducting portion for image transmission of the optical instrument is composed of a fibrous transparent substance capable of functioning as a lens, a fiber bundle consisting of numerous optical fibers with an extremely small diameter in prior fiberscopes is not required. According to the present invention, therefore, an optical instrument for microscopic inspection which is simplified in structure and can be equipped with a high capability of resolution can be produced efficiently and at low cost, without necessitating complex steps of fabrication. Also, in accordance with this invention, such an optical instrument having an extremely small diameter is obtainable, because the invention can afford a light conducting portion for image transmission having the same or a superior degree of resolving power to that of the fiber bundle of the conventional fiberscope but having a smaller diameter than the prior fiber bundle.

When there is a need for the provision of an objective at the front end of a light conducting portion for image transmission of the optical instrument, a lens consisting of the above transparent substance having such a refractive index distribution like that of the fibrous transparent substance employed in the light conducting portion of the optical instrument (though $a$ is generally different from that of the fibrous transparent substance), instead of an ordinary optical lens, may be provided to obtain an optical instrument for microscopic inspection having a superior resolving power and a small diameter.

Examples of the image transmitter according to the invention will be described in detail, as follows.

EXAMPLE 11

Figure 36:
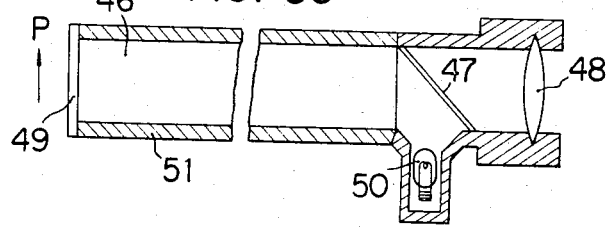
FIG. 36 is a schematic view, in section, showing a view finder which functions as an image transmitting part of an image transmission device according to the invention.
Figure 37:
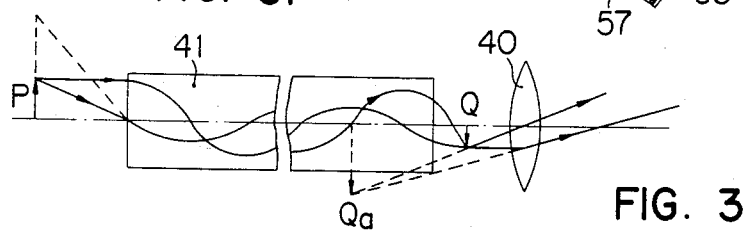
FIG. 37 is a view of schematic optical system of the view finder illustrated in FIG. 36.

A bar of glass with a diameter of 1 mm. and consisting of 56 wt. percent of $SiO_2$, 14 wt. percent of $Na_2$, 20 wt. percent of $Tl_2O$ and 10 wt. percent of PbO was immersed in a bath of potassium nitrate at a temperature of 500°C for 24 hours, whereby a glass bar having a center refractive index of 1.53, and the distribution of internal refractive index $n$ nearly satisfying the equation $n = N(1 - ar^2)$, where $a = 7.7$ cm$^{-2}$ was obtained. This was cut and both ends thereof were ground so as to be perpendicular to its center axis, to obtain a glass bar with a length of 51.5 cm. With this glass bar being light conducting pprtion for image transmission, an optical instrument for microscopic inspection as illustrated in FIG. 36 was fabricated. In FIG. 36, the reference numeral 46 designates the glass bar capable of functioning as a lens, 47 a semitransparent reflection plate, 48 an ocular lens, 49 a protection glass plate, 50 a light source for illumination, and 51 an enveloping tube for protection. The light of the light source 50 is reflected by the semitransparent reflection plate 47, thereafter entering the glass bar 46 and emitting out of the end face of the glass bar on the side of an object, to illuminate the object P. The light due to the object P enters the glass bar through the protection glass plate and progresses in the interior of the bar to form a real image in the neighborhood of the end face thereof on the side of the image. This image is magnified by the ocular lens 48 for observation. A part, within a circle with a diameter of 1 cm., of the object approx. 2 cm. in front of the tip of the glass bar was clearly observable. And its image of 0.1 cm. was formed at the position outside the end face of the glass bar on the side of the image. The optical system of this instrument is illustrated in FIG. 37, where Q represents a real image and $Q_a$ a virtual image. When approx. 30 cm. of a center portion of the glass bar of this optical instrument was curved with a curvature radius of approx. 20 cm., an object could be observed with hardly any influence thereof.

EXAMPLE 12

Figure 38:
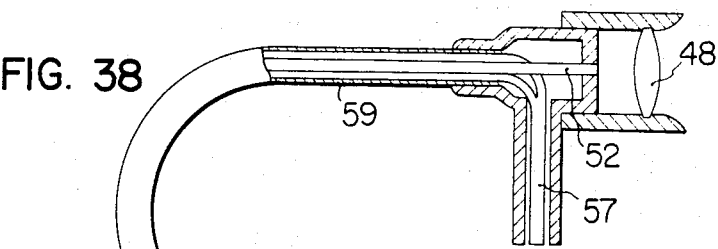
FIG. 38 is a view, partly in section, showing a modified view finder to be used, in combination with the image transmission device according to the invention.
Figure 39:
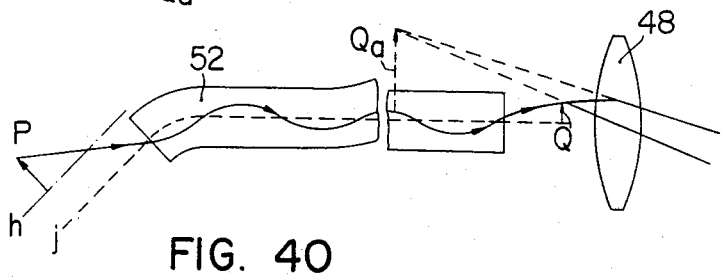
FIG. 39 is a view of schematic optical system of the view finder illustrated in FIG. 38.

A bar of glass with a diameter of 0.6 mm. and consisting of 48 wt. percent of $SiO_2$, 12 wt. percent of $Na_2O$, 20 wt. of $Tl_2O$ and 20 wt. percent of PbO was immersed in a potassium nitrate salt at a temperature of 480°C for 100 hours. This bar was cut into a length approx. 50 cm. and, after heating it up to 520°C, the leading end of the bar was bent by approx. 45° with a curvature radius of 1 mm. with respect to its center axis). Thereafter, its internal stress was removed by maintaining it at a temperature of approx. 450°C for 10 hours. This bar showed a center refractive index N of 1.60, a surface refractive index of 1.52, and an internal refractive index $n$ nearly satisfying the equation $n = N(1 - ar^2)$, where $a = 0.56$ mm$^{-2}$. The end faces of the bar were ground so as to be perpendicular to its center axis. An optical instrument for microscopic inspection as illustrated in FIG. 38 was fabricated with the bar empoyed in its light conduction portion for image transmission with the curved side thereof on the side of an object. The reference numeral 52 designates a glass bar having a curved leading end, 58 a protective glass, 57 a light guide for illumination, 59 an envelope, and 48 an ocular lens. As illustrated in FIG. 39, the light due to the object P in a slightly oblique direction in front of the extension $j$ of the center axis at the leading end of the glass bar forms its real image Q slightly off the other end face of the glass bar, the real image Q being magnified by the ocular lens 48 into a virtual image $Q_a$ for observation.

The chain line $h$ shows the extension of the optical axis at the curved portion. The optical instrument permits obervation while its center portion is curved wtih a curvature radius of 15 cm.

EXAMPLE 13

Figure 41:
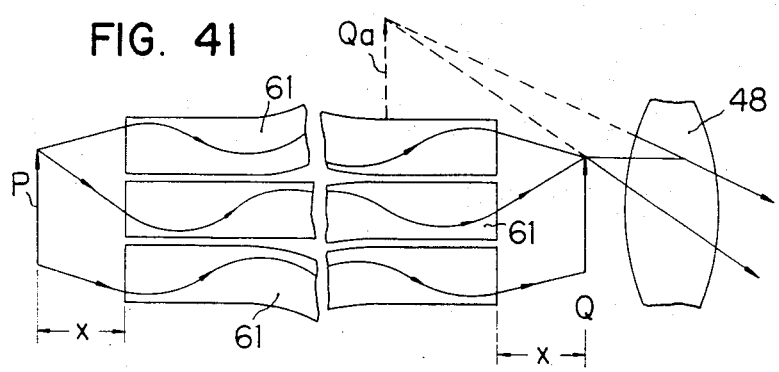
FIG. 41 is a view showing schematic optical system of the view finder illustrated in FIG. 40.
Figure 40:
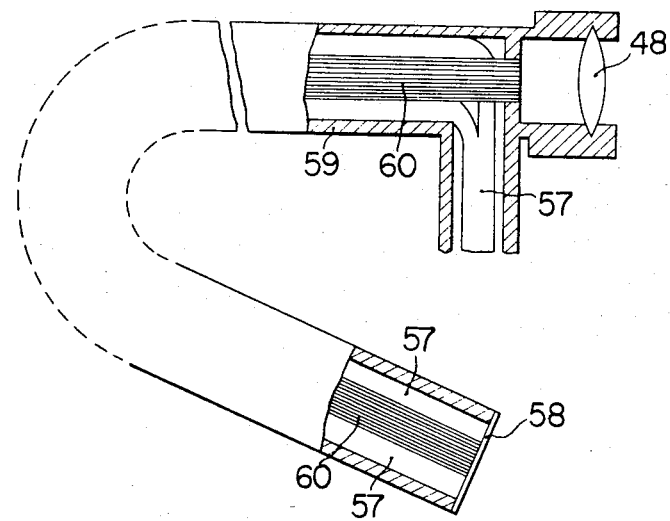
FIG. 40 is a view, partly in section, showing a modification of the view finder illustrated in FIG. 38.

Glass fibers with a diameter of 0.2 mm. and consisting of 20 wt. percent of Tl$_2$O, 12 wt. percent of Na$_2$O, 20 wt. percent of PbO and 48 wt. percent of SiO$_2$ were immersed in a high temperature bath of potassium nitrate for a definite period of time whereby glass fiber having a center refractive index N of 1.60, a surface refractive index Of 1.57, and an internal refractive index distribution of $n = N(1 - ar^2)$, where $a = 1.88 \times 10^2$ cm$^{-2}$ was obtained. Several tens of these glass fibers were bundled in such a manner that they are arranged in the same order at both ends and then the ends were bonded with adhesives. However, the length of each fiber is determined at a certain definite value. An optical instrument for microscopic inspection as illustrated in FIG. 40 was fabricated with the bundle of fibers emplyed in its light conducting portion for image transmission. The reference numeral 60 represents the bundle of fibers, 48 an ocular lens, 58 a protective glass plate, 57 a light guide for illumination, and 59 an envelope. An object at a definite distance in front of the optical instrument could be observed clearly. The relationship between the object and its image in this instance is plotted in FIG. 41, where 61 designates individual fibers. An erect real image having the same size as the object P is formed at a position spaced apart from the other end of the bundle of fibers by a distance equal to a distance $x$ between the front end of the bundle of fibers and the object. This real image Q was magnified by an ocular lens 48 into a virtual image $Q_a$ for observation. The optical instrument can stand use ever when it is dent with a curvature radius of aporox. 5 cm. Moreover, by adjusting the positions of the objective provided additionally at the front end of the fiber bundle and of the ocular lens, an object at various different distances could be observed.

EXAMPLE 14

Figure 42:
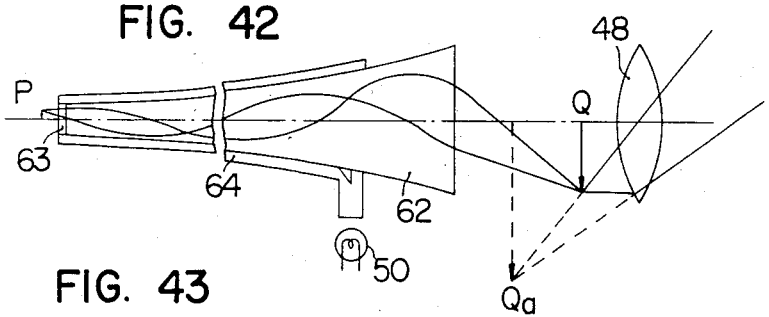
FIG. 42 is a view showing schematic optical system of other view finder which is used in combination with an image transmission device according to the invention.
Figure 43:
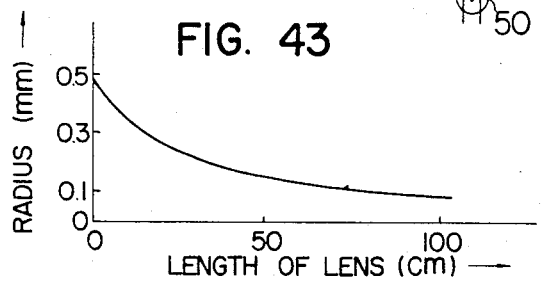
FIG. 43 is a view showing relation between radius and length of a fiber glass body according to the invention and used in the view finder illustrated in FIG. 42.

The radius of a fibrous glassy substance obtained by melting a glass of the same composition as that in example 13 in a temperature range 900° and 950° and extracting it at regulated speed became as shown in FIG. 43. After being cooled gradually for removal of stress, the glassy substance was immersed in a bath of potassium nitrate maintained at 460°C with its portion of a greater diameter facing downward. And the glassy substance was extracted therefrom at gradually varied speeds. The refractive indexes of the cross section of the glassy substance thus obtained have such a distribution that $a$ is decreased at a certain rate with increase in diameter. By using this glassy substance in a light conducting portion for image transmission, an optical instrument for microscopic inspection was fabricated as illustrated in FIG. 42, where 62 represents the glassy substance and 63 a protective glass. The light led from a light source 50 through a light guide 64 radiates an object P to be observed. The light-beams due to the object P are introduced into the glassy substance 62 and progress while oscillating around the center axis thereof and gradually inscreasing the amplitude of its oscillation. The length of the glass substance 62 is predetermined so that an image is formed outside its end face. This image Q is observed through an ocular lens 48 as a virtual image $Q_a$. A magnified image of superior resolving power is obtained by the optical instrument, and the instrument can be reduced in the diameter of its front portion and provided with flexibility, so that the optical instrument is particularly suitable for the observation of minute portions. In an optical transmitting transparent body have a refractive index which decreases gradually toward the surface in proportion square of the distance from its center axis, there occurs hardly any difference in the light-beam passages, that is phase and velocity deviation hardly occurs between the individual light beams. Accordingly, the above-mentioned transparent body is very excellent as the light transmitting body for optical communication.

On the other hand, the light transmitting transparent body as described above must a very fine element having a diameter such as 0.1 - 1 mm as in the case of a fine optical fiber and accordingly having a small inhearent spot-size, so that it is very difficult to secure the following facts.

1. The input light beam can enter into input end face of the transparent body without getting out from said body.

2. Light beams each having a spot-size equal almost to its inherent spot size are effectively entered into the transparent body so that their modes are almost matched. This problem is very important in practice in the case of being used in a optical communication system. However, according to the invention, the above difficult problem has been simply solved by enlarging the opening of the input end surface of the light transmitting transparent body having the refractive index distribution according to the invention.

In FIG. 47(A), a conical body 1 formed between sectional planes S$_1$ – S$_{1a}$ and S$_2$ – S$_{2a}$ perpendicular to center axis z is an improved optical lens element according to the invention, and the member 73 is a transparent light-beam transmitting conductor having a predetermined refractive index gradient as described already. Now, a cylindrical coordinate having an axis z directed from the plane $S_1 - S_{1a}$ toward $S_2 - S_{2a}$ will be considered. In this case, refractive index $n_1(r, z)$ at a point of the body 1 can be represented approximately by the following equation (11).

$$n_1(r,z) = N_1(z) \; 1 - a_1(z) \cdot r_2 \tag{11}$$

where $z$ is a position on the center axis $z$, $r$ is a radial distance from the center axis, $N_1(z)$ is a refractive index at a position of $t$ the coordinate $(z)$ with respect to the center axis, and $a_1(z)$ is a positive coefficient determined by only the coordinate $(z)$. Furthermore, it is assumed that $N_1(z)$ and $a_1(z)$ are monotonously increased toward the plane $S_2 - S_{2a}$ from the plane $S_1 - S_{1a}$. On the other hand, the refractive index $n_2(r,z)$ at a point of the light conductor 73 is approximately represented by the following equation (12).

$$n_2(r,z) = N_2(1 - a_2R^2) \tag{12}$$

where $N_2$ is a refractive index on the center axis, having no relation to $z$, and $a_2$ is a positive constant having no relation to Z. In this case, it is assumed that refractive indices of the body 1 and the conductor 73 are equal at all parts of the plane $S_2 - S_{2a}$.

Figure 44A:
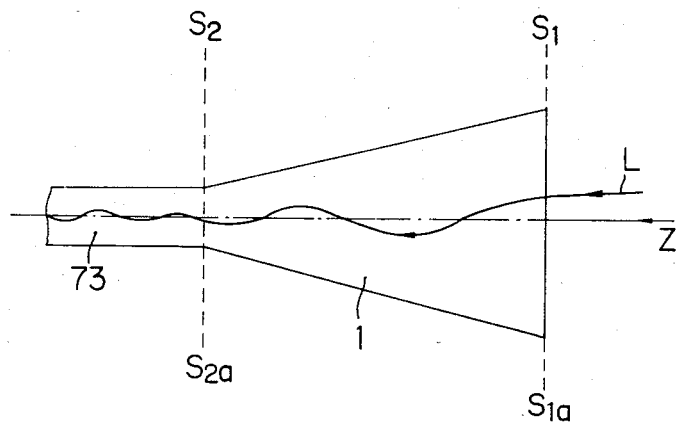
FIG. 44 (A) is a schematic view for showing an example according to the invention, in which the input end surface is enlarged.

Now, as shown in FIG. 44a it will be assumed that a light beam having Gaussian intensity distribution and having a center line shown by arrow line L is introduced at a point on the input plane $S_1 - S_{1a}$ in such a manner that the center line of the light beam is not coincident with the center axis $z$. The spot-size of the incident light beam is selected so as to be substantially equal to the inherent spot-size determined by the refractive index distribution on the input plane $S_1 - S_{1a}$. The light-beam transmitting lens body 1 has at its center part a refractive index larger than that at its peripheral portion as shown in the equation (11), so that the body 1 has a focusing function. Accordingly, the input light beam is greatly bent toward the center axis and crosses therewith. After this crossing, the light-beam advances toward the peripheral portion, but since the refractive index decreases with deviation from the center axis, the light beam is gradually bent and then again crosses the center axis. The above-mentioned function is repeated. This function has been described in detail in pages 2017 to 2053, Nov., 1965, "The Bell System Technical Journal" (S.E. Miller). However, the refractive index gradient of the lens body 1 increases from the plane $S_1 - S_{1a}$ toward the plane $S_2 - S_{2a}$, with increase in $(z)$, so that the light-beam focusing function also increases along the center axis with increase in $(z)$. Accordingly, the light beam progresses while oscillating around the center axis and approaches the center axis due to increase in the light beam focusing function. That is, the locus amplitude of the light beam decreases with increase in $(z)$. This light beam progresses along the center axis in the transparent body 73 while carrying out wave oscillation having a constant amplitude. This amplitude depends upon the deviation between the center line of the incident light beam and the center axis at the end face of the transparent body 1. When the light transmitting transparent body 1 having a large inherent spot-size at only the end face is utilized, it becomes possible to make any light beam enter into a fine, flexible light transmitting transparent body 73 while avoiding deviation of the incident light beam from the input end face of the body 73. In the case where the center line of the incident light beam is exactly coincident with the center axis of the light transmitting transparent body 1, the light beam progresses without oscillation of the center line of the light beam. The spot-size of the light beam decreases gradually during its progression through the interior of the transparent body, and the light beam progresses through the transparent body 73 while having a spot-size which is substantially equal to the inherent spot-size of the body 73.

Figure 44B:
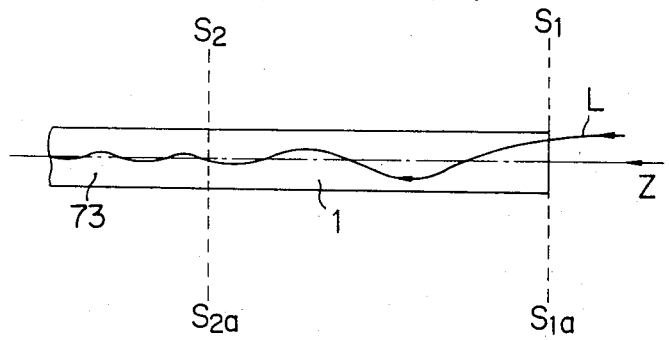
Figure 45:
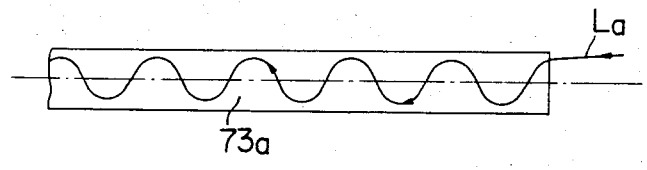
FIG. 45 is a schematic view showing a conventional case corresponding to the example shown in FIG. 44 (A) or FIG. 44 (B)

Now, the conventional case in which a light beam is made to enter into an end face of a light transmitting transparent body having a constant refractive index gradient is compared with such light transmitting transparent body according to the invention as described above. The conventional case is shown in FIG. 45, in which it is assumed that the light transmitting tranparent body 73a has sectional dimension and refractive index distribution which are respectively equal to those of the transparent body 73 shown in 44 (A). When a light beam 1a having a spot-size equal substantially to the inherent spot-size of the transparent body 73a is emitted into the transparent body 73a while maintaining the deviation between the center line of the light-beam and the center axis of the transparent body 73a at a range which is substantially equal to that in the case of FIG. 44(A), the light beam progresses through the transparent body 73a in such a manner that the center line of the light beam oscillates in a sine wave state with a constant amplitude. Wave length of this oscillating wave is almost equal to that in the interior of the transparent body 73 shown in FIG. 44(A), but the amplitude of oscillation is remarkably larger than the amplitude in the interior of the transparent body 73 in FIG. 44 (A). When a part of the light transmitting transparent body is bent, progressive passage of the light beam deviates outward at the bent portion. In this case, if the light beam comes in collision with a side surface of the transparent body, transmission of the light is prevented. In the case of example of FIG. 45, in which the oscillation amplitude of the light beam in the interior of the transparent body is large, it is clear that collision of the light beam against the side surface of the transparent body caused by bending of the body is more liable to occur than the case of FIG. 44(A) in which the oscillation amplitude is small. For the sake of decreasing the amplitude of the light beam in FIG. 45 to the range equal to the amplitude in the interior of the transparent body 73 in FIG. 44 (A), it is necessary to make the center line of the light beam entered into an end face of the transparent body 73a coincide with the center axis of the transparent body as much as possible. In other words, according to the transparent body as illustrated in FIG. 44 (A), adjustment of the input position of a light beam at the input end face of the transparent body does not necessitate such preciseness as needed in the case of the transparent body as illustrated in FIG. 45. Of course, the lens body 1 may have another shape, for example, a shape as shown in FIG. 44 (B), provided that the above-mentioned condition of the refractive index distribution is satisfied. Of course, the case of FIG. 44 (A) is better than the case of FIG. 44 (B), because the input face of the former case is larger than the latter case. In the example of FIG. 44 (A), the members 1 and 73 may be made of any transparent substance other than glass so far as it is transparent with respect to the light rays of the wave length to be used.

Figure 47:
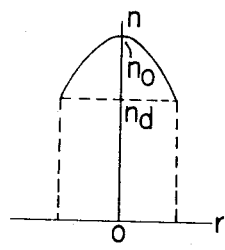
Figure 48:
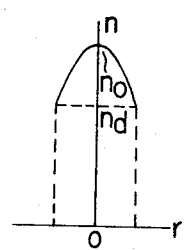
Figure 49:
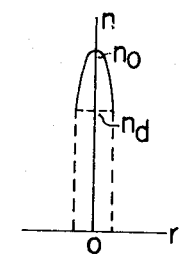

Length of the above-mentioned various light-beam transmitting transparent conductors according to the invention is limited from a manufacturing point of view. Accordingly, for the purpose of transmitting a light beam along a very long distance, connection of two or more conductors is required. This requirement can be effectively satisfied, according to the present invention, by gently decreasing at least one of $a$ and N of at least one of the conductors to be connected from an axial intermediate portion toward the end face to be connected, said conductors having the refractive index distribution represented by $n = N(1 - ar^2)$ as described already. For example, the value of N of one of two conductors to be connected is made to be subtantially the same along the axial direction thereof, and only the variable $a$ of said one is gradually decreased from the axial intermediate portion toward the end face to be connected with the other conductor. In order to attain easy manufacture of such a light conductor as described above and to make all parts of the conductor except the portion near the end face to be connected flexible, it is only necessary to enlarge the diameter of said end face more than that of the axial intermediate portion and to taper the conductor from said end face portion toward said axial intermediate portion. This taper may be any one as long as the following relation is satisfied.

$$d = d_o (1+\alpha Z)^{-1}$$

where Z represents a distance between said end face and said axial intermediate portion, $d$ represents a radius at a distance Z from the end face, $d_o$ represents a radius at the end face where $Z = 0$, and $\alpha$ represents a positive constant having a smaller value than $d_o^{-1}$. In the axial intermediate portion, it is preferable to make $d$ constant along the axis irrespective of the above-mentioned equation. Under the above assumption, if the refractive index $n_d$ at the surface of the conductor is taken to be substantially constant along the axial direction, and the refractive index distribution in the sectional plane perpendicular to the center axis is selected to satisfy the equation $n = N(1 - ar^2)$, then $a$ will be gradually decreased, in accordance with the equation $a = k(1+\alpha z)^2$ (where $k$ is a positive constant) from the axial intermediate portion toward the end face to be connected, that is, decreased wtih a decrease in Z. Variations of outer diameter and refractive index distribution in the case of the above assumption are designated in FIGS. 46 to 49. In FIG. 46, variation of the outer diameter of the light-beam transmitting conductor is shown, and FIGS. 47, 48 and 49 show, respectively, refractive index distribution along the end $S_3$, sectional planes $S_4$-$S_{4a}$ and $S_5$-$S_{5a}$ in FIG. 46. The refractive index $n_o$ at the center axis and that $n_d$ at the surface of the conductor are substantially constant, but the value of $a$ is minimum at the end face $S_3$. This end face corresponds to the surface to be connected in this invention.

Figure 50:
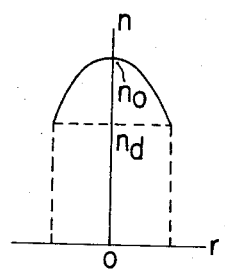
Figure 51:
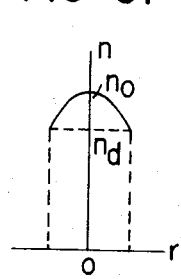
Figure 52:
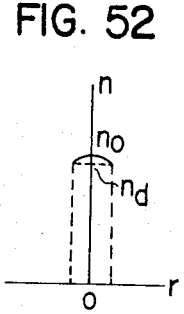

In the above case, if N is selected to be gradually decreased toward the end face $S_3$ from the axial intermediate portion, $a$ may be substantially constant along the axial direction. The refractive index distributions in this case are shown in FIGS. 50, 51, 52 which show, respectively, refractive index distributions at the end face $S_3$, sectional planes $S_4$-$S_{4a}$ and $S_5$-$S_{5a}$ in FIG. 46.

The other method embodying the system of connecting light-beam transmitting conductors consists in that $a$ and N are gradually decreased from the axial intermediate portion toward the end face to be connected. In this case, the conductor can be embodied as a rod having a substantially constant outer diameter. If the refractive index $n_d$ at the surface is selected to be substantially constant along the axial direction and the refractive index N at the center axis is gradually drecreased from the axial intermediate portion toward the end face, $a$ also is decreased from the axial intermediate portion toward the end face. In this case, the outer diameter and refractive index distributions of the light-beam transmitting conductor are shown in FIGS. 53 to 56. FIG. 53 shows the outer diameter of the conductor, and FIGS. 54, 55 and 56 show, respectively, refractive index distributions at end face $S_6$, sectional planes $S_7$-$S_{7a}$ and $S_8$-$S_{8a}$. The factors $d$ and $n_d$ are substantially constant along the axial direction, but N and $a$ are minimum at the end face $S_6$ which is the surface to be connected with other conductor.

Generally, in the case of the transparent body having, at its sectional area perpendicular to its center axis, a refractive index distribution represented substantially by the equation $n = N(1 - ar^2)$ which has been clearly described already; in order that a light beam can advance in the state of a constant spot-size through the conductor, it is necessary to make the incident light beam match with the optimum spot-size inherent to the input end face of the conductor, said optimum spot-size $W_o$ being represented by the following equation $$W_o = \sqrt{(\lambda/N(o)\pi)} \cdot 2^{-3/4} \cdot a(o)^{-1/4},$$

, where $\lambda$ is a wave length of the input light beam in free space, $N(o)$ is the value of N at the end face and $a(o)$ is the value of $a$ at the end face.

As described above, if at least one of two light beam transmitting conductors is made to have the above-mentioned refractive index distribution, the optimum spot-size inherent to the end face is enlarged, thus causing easy matching of the optical axis to be connected and high accuracy of mode matching of the conductors.

Furthermore, since the refractive index distribution of the conductor varies toward the end face, if the refractive index distributions at both end faces to be connected are selected so as to be substantially equal to each other, their modes can be easily matched by contacting both conductors in the state of coincidence of their optical axis. Of course, in the case when the refractive index distributions at both end faces to be connected are different, their mode matching can be attained by way of an appropriate lens system.

Example of connection of two light-beam transmitting conductors made according to the above-mentioned principle are shown in FIGS. 58 and 59.

In the example of FIG. 58, a light beam 76 is transmitted through a first light-beam transmitting conductor 74 while having a spot-size equal to an optimum spot-size of said conductor and expands gradually and then enters into a second light beam transmitting conductor 75. This second conductor 75 has a character as described in connection with FIGS. 46 to 52 or FIGS. 53 to 56, the diameter of the light beam entered into the second conductor becoming gradually smaller while carrying out an oscillation as shown in the Fig.

Referring to FIG. 59, both conductors 77 and 78 correspond to the conductors 74 and 75, but both conductors 77 and 78 are made to have the character as described in connection with FIGS. 46 to 52 or FIGS. 53 to 56. The light beam 79 propagated through the conductor 77 while oscillating around the optical axis thereof is focused after its discharge from the output end thereof and then enters, in the state having the narrowest width, into the input end face of the conductor 78. In this example, if the spot-size of the incident light beam of the second conductor 78 is coincident with the optimum spot-size of the conductor 78 itelf, the incident light beam propagates through the conductor without oscillation thereof, but when said spot-sizes are not coincident, the incident light beam progresses while oscillating as shown in the Fig. In all cases, by utilizing a conductor with a large input end face having an optimum spot-size, preferably a diameter, it becomes possible to transmit any light beam to said conductor without any leakage thereof. The conductors 74, 75, 77 and 78 may be made of any transparent solid substance such as glass, synthetic resin and the like.

An actual example of the example shown in FIG. 58 will be described below. A glass fiber composed of 56 percent of $SiO_2$, 14 percent of $Na_2O$, 20 percent of $Tl_2O$ and 10 percent of PbO, respectively by weight percentage, and having a length of about 10 m is prepared so as to have the form of the conductor in FIG. 58. This conductor is immersed in a bath of potassium nitrate while the condition along axial direction is varied, whereby a conductor having a refractive index of 1.554 at the surface, a refractive index of 1.562 at the center axis, said indices being of a constant value along the axial direction, and a refractive index distribution according to the following equation at a sectional area perpendicular to the central axis:

$$n = N(1 - ar^2)$$

can be obtained. If the wave length of the input light beam in free space is assumed to be 0.6328 micron, the optimum spot-size $W_o$ at an end face having a radius of about 0.5 mm becomes about $17.8 \times 10^{-3}$ mm. If the conductor is made so as to have a constant radius of about 0.1mm and prepared while maintaining various conditions so that its refractive index distribution is equal to that at center portion of the conductor shown in FIG. 53, the optimum spot-size at the end face becomes about $8.0 \times 10^{-3}$ mm. Accordingly, the spot-size can be enlarged in this invention. Another light-beam transmitting conductor having the same refractive index distribution as that of the afore-mentioned conductor is manufactured, and the end faces of both conductors to be contacted are ground. Then, these ground faces are merely contacted, whereby both conductors are effectively connected from the optical point of view. In this case, at least one of the end faces to be connected is enlarged, so that matching of their optical axis becomes easy, and preciseness of mode matching also becomes high because of the relatively large optimum spot-size.

We claim:

1. A light beam transmitting transparent conductor consisting of an elongated optical transparent element having a refractive index distribution in each cross-section perpendicular to the center axis of said element approximately satisfying the following relationship $n = N(1 - ar^2)$ where $N$ represents the refractive index at said center axis in any element cross-section, $n$ represents the refractive index at a radial distance $r$ from said center axis in said cross-section, and $a$ is a positive constant in said cross-section, said transparent element having an input end face and an output end face each perpendicular to said center axis and having an optimum spot size at said input end face represented by the following formula $$W_o = \sqrt{(\lambda/No\pi)} \cdot 2^{-3/4} \cdot ao^{-1/4}$$

where $W_o$ represents the optimum spot size at said input end face, $\lambda$ represents the wave length of a light beam to be transmitted through said transparent element, $No$ represents the refractive index value $N$ at said input end face, and $ao$ is the value of $a$ at said input end face, at least one of the factors $N$ and $a$ being such that the value thereof increases gradually from at least said input end face of said element toward an intermediate portion of said element along said center axis so that said element has an optimum spot size gradually increasing from said intermediate portion toward said input end face in such a manner that a light beam accurately introduced into said element upon said input end face with proper mode matching is transmitted axially through said element and exits therefrom at said output end face.

2. A light-beam transmitting transparent conductor as claimed in claim 1 in which said element has a cross-sectional radius which increases from said intermediate portion toward said at least one end surface.

3. A light beam transmitting conductor consisting of at least two sections disposed in end-to-end relationship to provide a long conductor, each of said sections consisting of a rod-shaped transparent element having a refractive index distribution in each cross-sections perpendicular to the center axis of said element approximately satisfying the following relation $n = N(1-ar^2)$ where $N$ represents the refractive index at said center axis in any element cross-section, $n$ represents the refractive index at a radial distance $r$ from said center axis in said cross-section, and $a$ is a positive constant in said cross-section, each said transparent element having two opposite end faces each of which is perpendicular to said center axis and having an optimum spot size at one of its end faces represented by the following formula $$W_o = \sqrt{(\lambda/No\,\pi)} \cdot 2^{-3/4} \cdot ao^{-1/4}$$

where $W_o$ represents the optimum spot size at said one end face, $\lambda$ represents the wave length of a light beam to be transmitted through said transparent element, $No$ represents the refractive index value $N$ at said one end face, and $ao$ is the value of $a$ at said one end face, at least one of said two elements having at least one of the factors $N$ and $a$ thereof gradually increasing from at least said one end face which is disposed adjacent an end face of the other of said to elements toward an intermediate portion of said one element along said center axis so that said at least one of said two elements has an optimum spot size which increases gradually from said intermediate portion toward said one end face in such a manner that a light beam exiting from an end face of said other element is accurately introduced into said one element upon said one end face with proper mode matching and is axially transmitted through said one element.

* * * * *